US006954676B2

(12) United States Patent
Dorsch

(10) Patent No.: US 6,954,676 B2
(45) Date of Patent: Oct. 11, 2005

(54) WINDOW OR DOOR MANUFACTURING METHOD AND APPARATUS

(75) Inventor: Paul V. Dorsch, Warren, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 259 days.

(21) Appl. No.: 10/331,264

(22) Filed: Dec. 30, 2002

(65) Prior Publication Data

US 2003/0233163 A1 Dec. 18, 2003

Related U.S. Application Data

(60) Provisional application No. 60/389,733, filed on Jun. 18, 2002.

(51) Int. Cl.[7] .......................... G06F 19/00; G06F 17/60
(52) U.S. Cl. .......................... 700/95; 700/117; 700/180
(58) Field of Search ............................. 700/95–97, 99, 700/100, 115–117, 157, 171, 180, 182

(56) References Cited

U.S. PATENT DOCUMENTS

| | | | | | |
|---|---|---|---|---|---|
| 5,570,292 | A | * | 10/1996 | Abraham et al. | 700/157 |
| 5,757,647 | A | * | 5/1998 | DeMichele | 700/95 |
| 5,933,353 | A | * | 8/1999 | Abriam et al. | 700/182 |
| 6,377,864 | B1 | * | 4/2002 | Lindstrom | 700/96 |
| 6,681,140 | B1 | * | 1/2004 | Heil | 700/95 |
| 6,687,557 | B2 | * | 2/2004 | Ouchi | 700/95 |
| 6,810,401 | B1 | * | 10/2004 | Thompson et al. | 707/101 |
| 2003/0208293 | A1 | * | 11/2003 | Mountcastle et al. | 700/96 |
| 2003/0225470 | A1 | * | 12/2003 | Demetriou et al. | 700/100 |

OTHER PUBLICATIONS

WinIG® Software, Version 3.XX, Copyright 1994–2001, Glass Equipment Development, Inc., 355 pages.
WinCut™ II Software, Version 1.03, Copyright 1997–2000, Glass Equipment Development, Inc., 106 pages.
Series 6000 Computerized Glass Cutting System (Gen 4), Copyright 1997–2000 Glass Equipment Development, Inc., 75 pages.

* cited by examiner

Primary Examiner—Paul Rodriguez
(74) Attorney, Agent, or Firm—Watts Hoffmann Co., LPA

(57) ABSTRACT

An exemplary embodiment of the invention concerns a method of manufacturing a window or a door. Different groups of components are defined. These components combine to form a window or door. The components that make up a group are monitored on a viewing screen during movement of those components through a manufacturing or assembly location. Practice of the invention facilitates setting up and identifying standard and custom groups for the Window and Door Industry. These groups include but are not limited to the following items, Glass, IG Units, Muntins, Gas, Frames, Sashes, Windows Lines and Window Styles. Such visual software helps set up a window manufacturing sequence criteria used for processing the various groups. It allows the set up of various multiple sort levels and sort criteria within the Groups.

32 Claims, 21 Drawing Sheets

Fig.2c

*Laminated-Edit Process Definition*

☑ Enabled    Process 1  143

Process Type
⦿ Special StockNumbers   ⦿ AccenTrim

Lite Symbols — 141
Inner: [S]   Center: [S]   Outer: [S]

[Done]
[Cancel]

Available Special Stock Numbers

| Stock No | Description |
|---|---|
| (NOSPECL) | *NO SPECIAL STOCKS* |
| LAMINATED | LAMINATION |
| SPEC2 | SPECIAL OPTION 2 |
| SPEC3 | SPECIAL OPTION 3 |
| TEMP | TEMPERED |

← 144

▲ ▲
▼ ▼   ← 145

Selected Items (1)

| Stock No | Description |
|---|---|
| SPEC1 | SPECIAL OPTION 1 |

By Groups—Edit Sort Level

☑ Enabled

Level 3

Sort Type — 280

○ Stock Numbers — 281
○ Glass Thickness

○ Production Groups — 282
○ Unit Size — 283

○ Spacers — 284
○ Specials

Available Spacers

| Stock No | Description | Type | Width |
|---|---|---|---|
| (NOSPACER) | ***NO SPAC | | |
| 901 | SPACER 1/4 | Other | 0 |
| OS21 | OTHER SPA | Other | 0 |
| SP001 | CROFT SPA | Other | |
| SP1 | 19/32 INTER | Intercept | 0 |
| SP11 | 11/32 SPAC | Intercept | 0 |
| SP15 | 15/32 | Intercept | 0 |
| SP2 | AA 21/32 IN | Intercept | 0 |
| SP3 | 23/32 SPAC | Intercept | 0 |
| SP4 | 15/32 SPAC | Intercept | 0 |
| SP5 | 7/32 SPACE | Intercept | 0 |
| SP9 | 9/32 SPACE | Intercept | 0 |
| SPPTO | 9/32 SPACE | Intercept | 0 |

Sort Order (3) items — 285

| Stock No | Description | Type | Width |
|---|---|---|---|
| SP19 | 19/32 | Intercept | 0 |
| SP13 | 13/32 | Intercept | 0 |
| SP21 | 21/32 INTER | Intercept | 0 |

Filter Available Spacers

☑ Intercept  ☑ Other

[All] [None]

[Done] [Cancel]

By Groups—Edit Sort Level

☑ Enabled

Sort Type
- ○ Stock Numbers — 280
- ⊙ Glass Thickness — 281
- ○ Production Groups — 282
- ○ Unit Size — 283

Level 3 — 284
- ○ Spacers
- ○ Specials — 285

Done

Cancel

Available Glass Thicknesses

| Thickness |
|---|
| 0.00 |
| 0.7 |
| 4.00 |

Sort Order (2) Items

| Thickness |
|---|
| 2.50 |
| 3.00 |

Fig.10

By Groups-Edit Sort Level

☑ Enabled

Level 3

Sort Type

○ Stock Numbers —280
○ Gloss Thickness —282
281— ○ Production Groups
283— ⦿ Unit Size 285
○ Spacers
○ Specials
284

Schedule

Sort Order
○ None  ⦿ Ascending  ○ Descending

☑ Only Sort Units Greater than or Equal to [16] sq. ft.

☑ Use Sub Groups

Sub Group Size
⦿ Units [25]
○ Use each Batch as a Sub Group

Sub Group Sort Order
⦿ Ascending
○ Descending

[Done]
[Cancel]

WINDOW OR DOOR MANUFACTURING METHOD AND APPARATUS

CROSS REFERENCE TO RELATED APPLICATION

The present patent application claims priority from U.S. provisional application entitled "Window manufacturing method and apparatus" which was filed Jun. 18, 2002 under provisional application Ser. No. 60/389,733.

FIELD OF THE INVENTION

The present invention concerns the manufacture of windows using apparatus and method that through a grouping and sorting procedure aid in the manufacturing, tracking and routing of constituent components during fabrication of windows.

BACKGROUND ART

A window manufacturer receives a quantity of raw materials into the factory and ships completed windows from the factory on a truck for delivery to a construction site and/or retail sales locations. One component of windows is the insulated glass unit. The insulated glass unit (IGU) consists of one or two spacer frames of metal and two or three (inner, center and outer) glass lites (sometimes referred to as panes) that are adhesively attached to the spacer frame. The completed IGU can be shipped as a completed product to a window manufacturer or can be assembled into a window sash on site at an integrated manufacturer.

Representative prior art patents owned by the assignee of the present invention relating to fabrication of window IGUs are U.S. Pat. No. 6,173,484 B1 to McGlinchy et al, U.S. Pat. No. 5,295,292 to Leopold, and U.S. Pat. No. 5,361,476 to Leopold. The disclosure of these prior art patents is incorporated herein by reference.

In the window and door industry, processing special orders requires a special or separate order, batch or schedule to be created. Certain conditions allow for a special, batch to be generated either at the beginning or end of a schedule, but this severely limits the items that can be placed in the special batch.

If a special schedule is created, this special schedule must be produced separately from the daily production. This requires that items contained in all special schedules be manufactured before or after the daily production schedule.

If the conditions do allow for a special batch to be added to the main daily production schedule, then the special batch will either be manufactured first or last in the daily production In either the case of a special schedule or a special batch, the glass for the special items is optimized separately in its own glass batch. Using either of the above methods results in every schedule being treated the same.

When using the current methods for creating and handling special items in the window and door industry, less than optimum glass usage can occur. Currently glass lites that need to have a special process performed (i.e. tempering, edge/bevel grinding, shapes, lamination etc) need to have their own separate batch. This reduces a glass optimizer's yield, because optimizers perform their optimization on batches. Once the lites have been cut they are placed in specific glass carts to be transferred to their destination to form part of an integrated glass unit.

The Glass Batch size is normally determined by maximum number of glass slots available in the glass cart(s) to be used for optimization. There are other possible restrictions to racking or slotting of the glass that will reduce the actual number of glass slots available. The following are examples:

Maximum glass thickness allowed per slot: If the glass thickness is greater than the maximum allowed per slot then two slots must be used (allocated) for that lite.

Skip Slot for Triple: When allocating slots the optimizer may presume that in a given batch an empty slot is left after the last lite of triple pane IG Unit(s). This empty slot reduces confusion during the assembly process.

The Optimizer Skips Slots for Out Sourced Lites by leaving an empty slot for pre-cut lites.

This prior art system can result in a larger glass inventory thus causing extra glass transport and handling systems to be used which increases cost in maintaining the large inventory. In order to keep glass scrap to a minimum, smaller glass sheets are sometimes used. These smaller glass sheets are part of the glass inventory and also take up additional factory floor space.

Multiple starting and stopping of the daily production schedule results in a loss of manufacturing efficiency when special units or items are immediately needed. Special Items are also more easily lost during the manufacturing process.

SUMMARY OF THE INVENTION

An exemplary embodiment of the invention concerns a method of manufacturing a window or a door. Different groups of components are defined. These components combine to form a window or door. The components that make up a group are monitored on a viewing screen during movement of those components through a manufacturing or assembly location.

Practice of the invention facilitates setting up and identifying standard and custom groups for the Window and Door Industry. These groups include but are not limited to the following items, Glass, IG Units, Muntins, Gas, Frames, Sashes, Window Lines and Window Styles. Such visual software helps set up a window manufacturing sequence criteria used for processing the various groups. It allows the set up of various multiple sort levels and sort criteria within a Group.

Practice of the invention also facilitates setting up and identifying transport systems used in the Window and Door Industry. These transport systems include but are not limited to Harp Carts, "A" Framed Carts, IG Unit Carts, Crane systems, and Conveyors Systems.

Additionally, practice of the invention facilitates setting up and associating various groups with a transport system. Each group may use a different transport system to move the group during the manufacturing process.

An exemplary embodiment uses a computer implemented system which presents a graphical visual means for allocating, identifying and integrating multiple groups into a single manufacturing schedule. This computer implemented system allows visual identification of a mixture of items in a schedule that can be used in the office and on the manufacturing floor, (i.e. mixture of glass lites, Muntins, Windows Styles and types plus IG Units that need to have a special manufacturing process performed, specific IG Units for vinyl or wood, windows that utilize screens or special kinds of screens or no screens at all).

Practice of the invention reduces glass scrap by combining multiple groups into a single optimization container (batch). This allows the batch to contain different groups that share a common glass type. The combining of groups into a batch makes the optimization process more efficient.

Reduction in glass inventory is a by-product of the exemplary grouping process. Commnon glass sizes can be utilized to contain the glass lites for different processes. This saves inventory cost, reduces factory floor space and reduces glass handling.

Increased manufacturing efficiency is accomplished by utilizing colors and text to easily and clearly identify the items that belong to a group and a transport system for the group. Since the transport system is specifically configured for the items in the group, this creates a highly structured and dedicated transport system specifically for the items in the group. This allows freedom in the manufacturing process to transport the groups independently throughout the manufacturing plant.

These and other objects and features of the invention will become better understood by reference to the accompanying detailed description of an exemplary embodiment of the invention which is described in conjunction with the accompanying drawings.

BRIEF DESCRIPTION OF THE DRAWINGS

FIG. 2c is a dialog accessible by clicking on an "edit process . . . " button of FIG. 2b;

Figure 3:
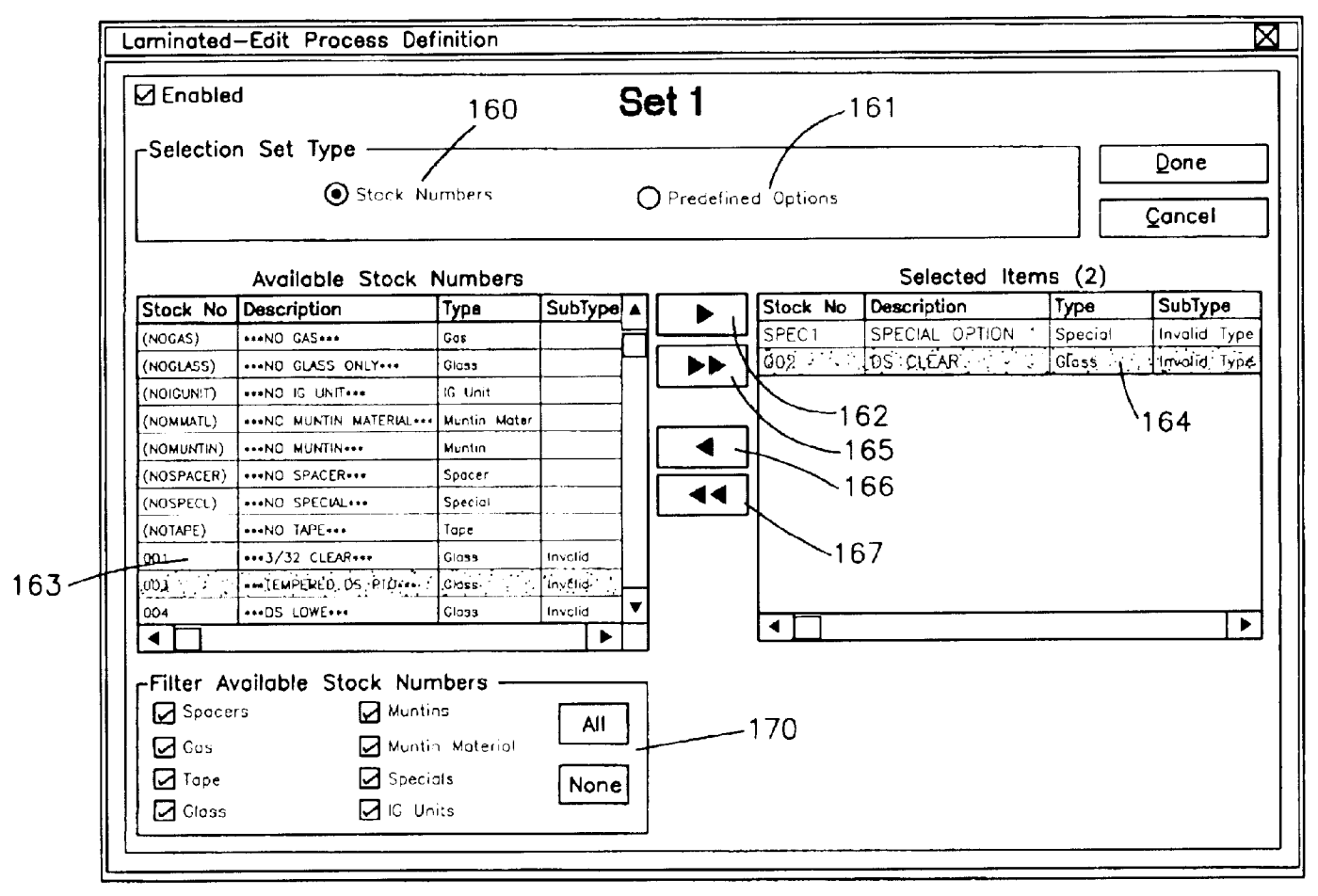

FIG. 3 is a selection dialog for choosing group properties based on stock numbers from a listing of stock numbers;

Figure 7:
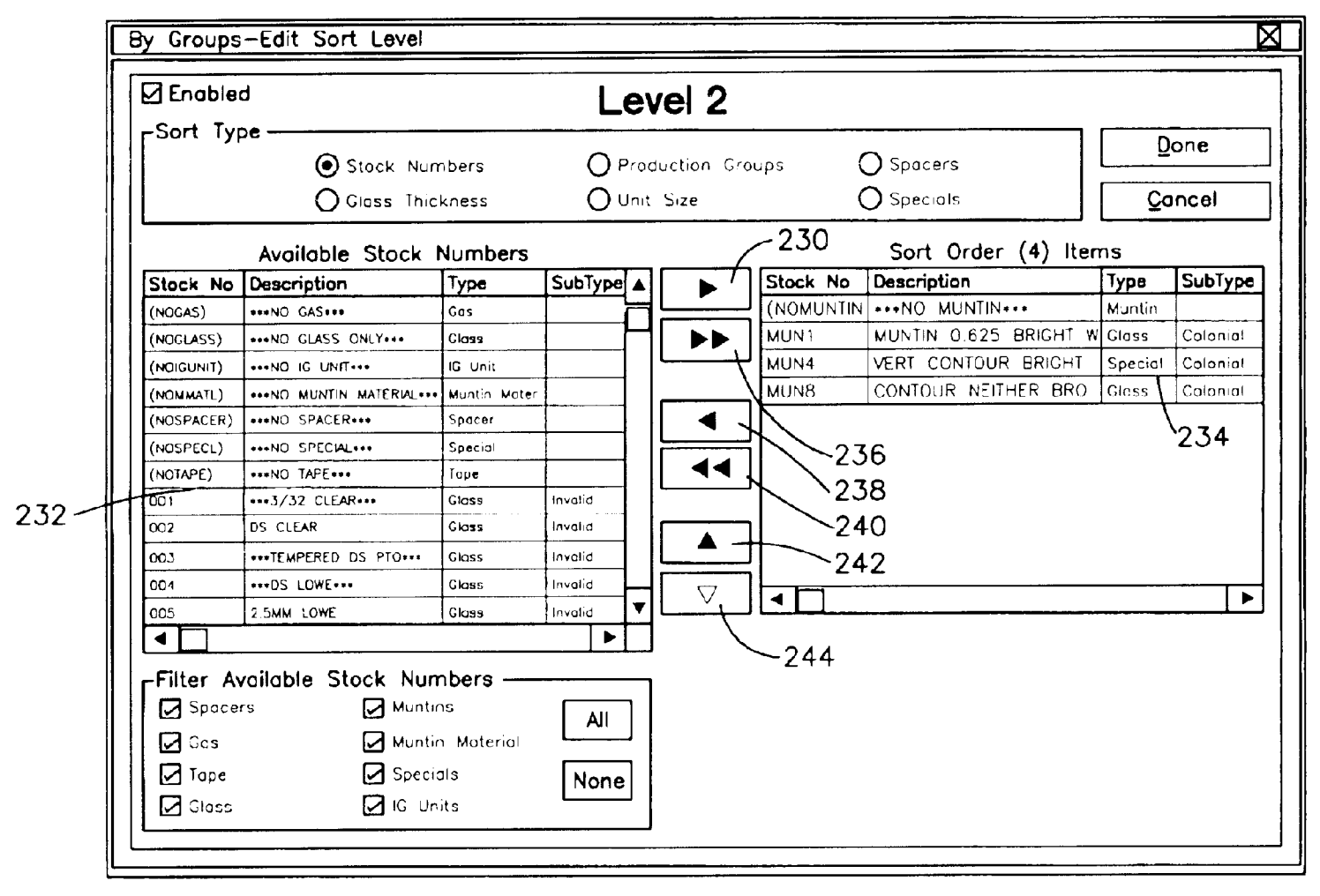
Figure 12:
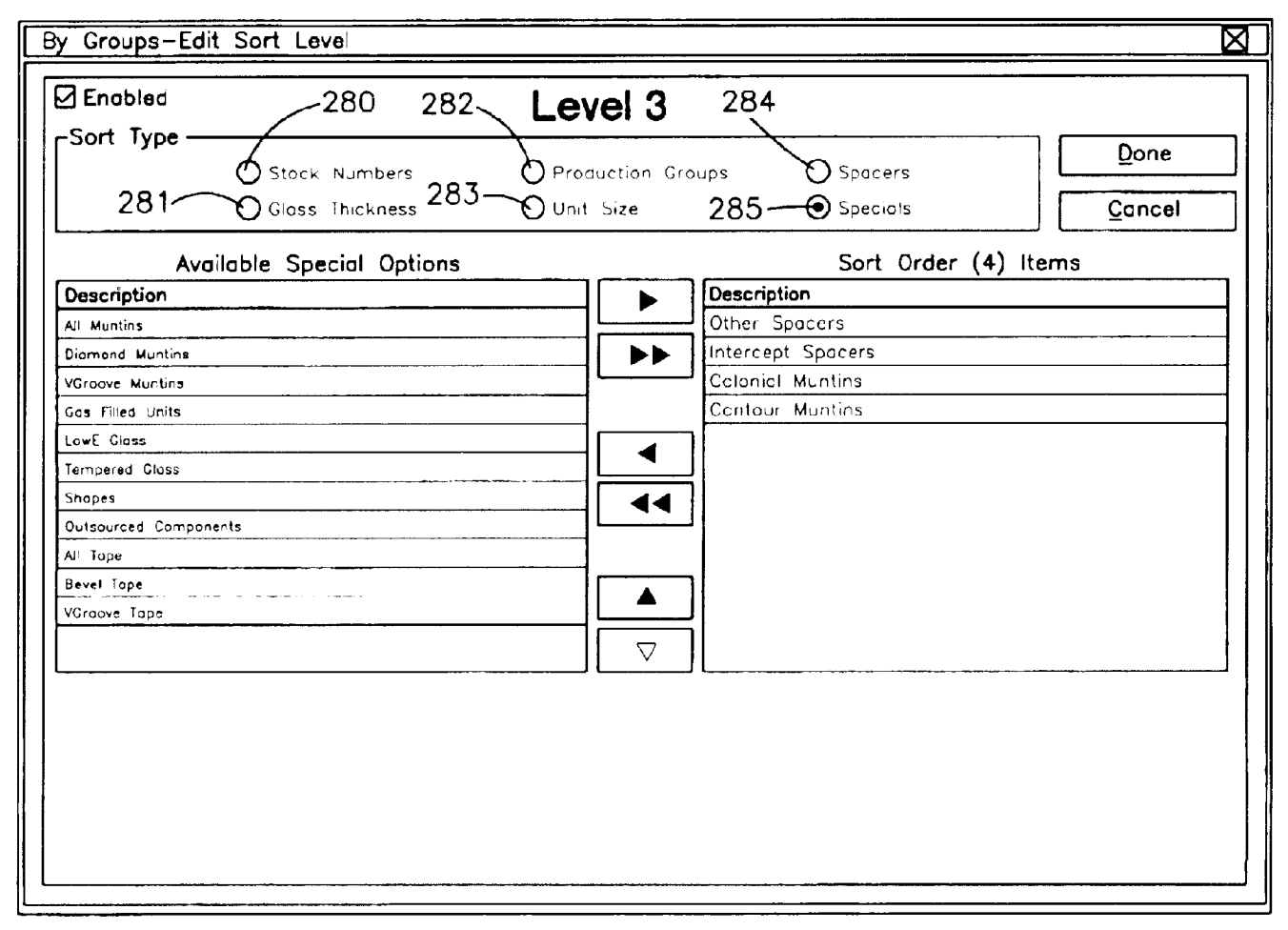

FIGS. 7–12 are dialogs showing different sort criteria with priority sequence within a sort level;

EXEMPLARY EMBODIMENT FOR PRACTICING THE INVENTION

The present invention relates to a manufacturing process for controlling the manufacture of insulated glass units or IGUs 10 (FIG. 15) and in some facilities a complete window of which an IGU is a component. The manufacturing process is co-ordinated by a network containing a number of networked computers or workstations that have visual display screens for presenting to planners/production personnel information regarding the manufacture of products within a manufacturing facility. Each computer includes an operating system that coordinates execution of application programs including an application program for implementing the exemplary embodiment of the present invention.

Grouping

One aspect of the present invention is to group components that go into the manufacture of a product. This means in the IGU industry that an order will come into the factory for a specified quantity of specified types of IGU units. Different IGU units have different stock numbers. Receipt of this order will, in accordance with the invention, cause the creation of one or more grouping designators (note, multiple groups can be created for a given order) for that order. From then on, all constituent components that go into products for that order are grouped together with the components that share this common group designator. Once one knows the group designator for a part, one also knows its order number. From then on the part can be efficiently routed from its initial location in inventory through its fabrication stages until the IGU (or possibly the entire window) is completed.

Figure 15:
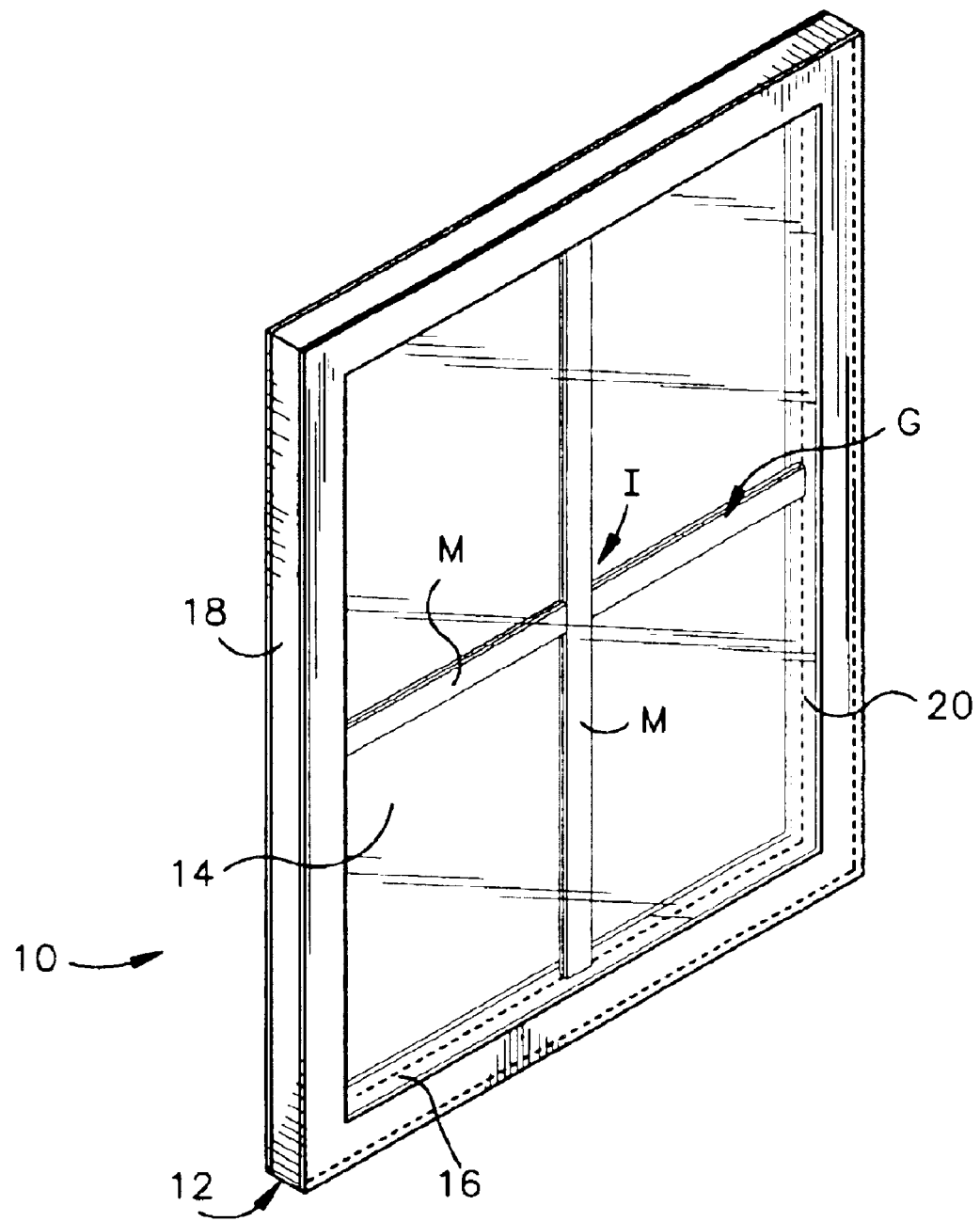
FIG. 15 is a perspective view of an insulated glass unit.

To give a specific example, The IGU 10 depicted in FIG. 15 includes inner and outer lites 14 and a spacer frame 12. The IGU 10 is also depicted as including a muntin bar grid G including intersecting muntin bars M, the two lites and spacer frame are assigned to a group before the actual manufacturing of the IGU begins. As the spacer frame is bent and cut and then moved to a location where lites are added. The group identifier for the spacer frame travels with the space frame along its way as it is fabricated into a finished IGU. Similarly, the IGU lites are cut from large glass sheets by an automated cutting device. As a lite is cut, the group identifier travels with it along its way to the finished IGU. If along the way to completion, one of the parts is damaged (panes of glass can break for example) a replacement pane is given the broken pane's group number and drawn from inventory to "catch up" with the rest of the components of the group.

Group designators are assigned at a control screen (FIG. 1) by a manufacturing supervisor. A given order can contain multiple available stock items having their own stock number. The supervisor can assign as a group a particular stock number and more particularly can assign within a group certain sizes and special items for that particular stock item. The supervisor also assigns to each group a designator or name and a color code. During manufacture of articles that belong to that group, an operator sees on a viewing monitor the color code for each item's group. Thus, as the glass lite for an IGU is being cut from a larger piece of glass, the viewing monitor will depict the lite along with its color code for the group to which it belongs as well as other information about that lite such as whether it is an inner or outer lite in the IGU, its orientation, and a label. This allows the operator to put the cut lite onto an appropriate cart so that the lite can be moved to the proper assembly location where it is mated with its spacer frame. Similarly, the spacer frame is depicted having an appropriate code on a viewing screen for the spacer frame fabrication worker who puts it on a conveyor to meet up with the cut lite. Note, the concept of group is applied before cutting of the glass since the group can be used to determine how the glass is treated before it is cut. As a specific example, lites that have been identified as tempered could be assigned by the production supervisor to the "Tempered" group within an order and may need to be processed before non-tempered lites (in a different group within an order) to take advantage of a tempering line's heat characteristics.

The grouping concept also extends to identifying certain lites that need special processing after they have been cut from their respective glass sheets. As a specific example a film or tape can be applied to certain selected lites to simulate muntin or edge beveled regions (Note, a muntin is the criss cross member of a window that makes a large pane look like it is made up of multiple smaller panes). Muntins, for example, are often used to divide a window up into four quadrants on the glass. Thus, when setting up the group for part of an order the supervisor could designate a group called "A-123", having a green color code and going into a particular size IGU. This group has tape applied in a particular pattern. When the glass is taken from inventory and after it has be cut and washed, the tape is applied before the lite is assembled into the IGU. Once the IGU is assembled it is placed in a rack and loaded onto a truck. The concept of grouping also extends to the loading dock where the person putting IGUs onto the truck can find a group member for a given order by a color coded label physically attached to the IGU that the manufacturing operator sees on his or her viewing monitor. Labels can be applied anywhere on the IGU (i.e. glass, spacer edge, frame or sash)

Sorting

Within a group, the process controller (computer) has the ability to sort the components. An order may include multiple numbers of IGUs of different size. This means a particular group within that order may need different size panes cut depending on the size of the IGU that is being built. The sorting allows the group to be built as efficiently as possible by finishing one type of IGU within the group and then adjusting the component characteristics for the rest of the IGUs within the group. Size is one example of sorting, but it is possible that sorting could also be performed according to certain IGU characteristics such as type of muntin. The muntin can be contoured, or rectangular or can also be made of different thickness material. It can be two-tone and may be accomplished in the form of a film that simulates muntin like dividing of the window. The types of sorting within a group are only limited by the criteria the production manager uses to sort the items. Other types of sorting relate to routing control of the parts as they are made so that for example part of the job goes to one cutting table and the rest goes to a different cutting table. Each table may be simultaneously cutting lites for the same group but sorting conveniently discriminates items within a group.

One aspect of the invention that makes grouping and sorting important is the ability to view the progress of the manufacturing process on a display screen. Each component has its grouping designator associated with it on the screen as it is being made. This may or may not be a physical tag on the component, but will at least include a visual indicator on the display screen at the fabrication location. When two or more components come together to form a complete unit, the display indicator can confirm that the group designators for these components are the same. The combination of sorting, grouping and visual verification is an advantage in making the manufacturing process more efficient.

Grouping Theory of Operation:

Groups are assigned and setup visually at a control screen (FIG. 1) by a manufacturing supervisor. A given customer order can contain multiple line items, each having its own stock number or special tag. The production supervisor can assign and setup multiple groups inside the "Production" or (main) group. Each group can have its own particular identifying color code, transport properties and selection criteria. The selection criteria only defines the items that will be placed into the group. It does not define the manufacturing sequence. The manufacturing sequence is defined using a Multi-Level Sort Configuration setup that is illustrated in FIG. 6.

Groups can then be prioritized within the "Production" or (main) group. This allows groups to have a placement priority inside a facility production schedule. The placement priority is used when two or more groups have a selection criteria that overlap each other. When one group's selection criteria overlaps another group's selection criteria, then an item in the customer order is placed in the group that has the higher priority.

The "Production" or (main) group has a "Base" group. The "Base" group will contain all the items that do not satistify the selection criteria specified in any other group. If no groups were added to the "Production" or (main) group then all items will be placed in the "Base" group.

Figure 6:
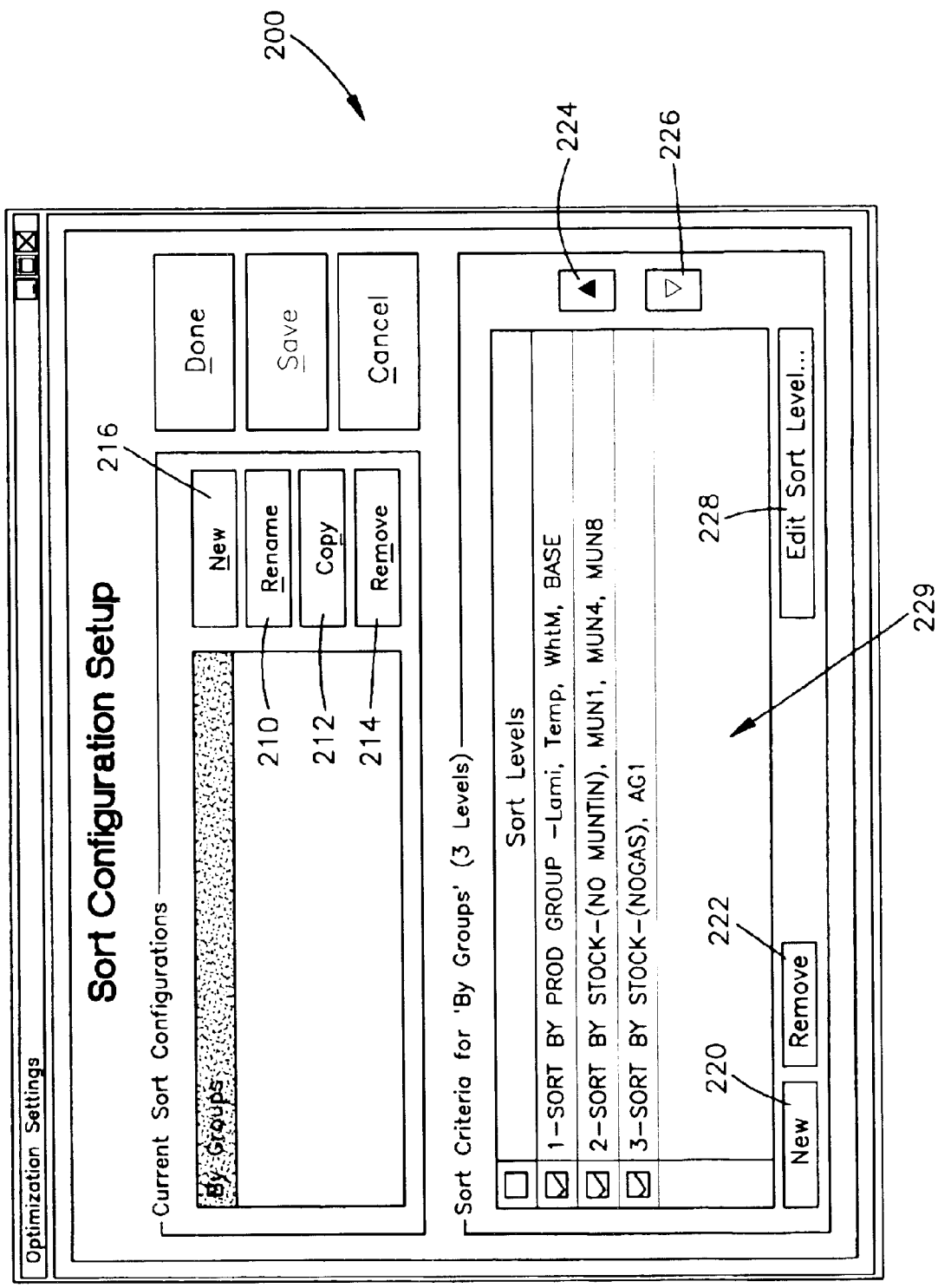
FIG. 6 is a sort configuration set up dialog for establishing a sort criteria for items classified within a group.
Figure 8:
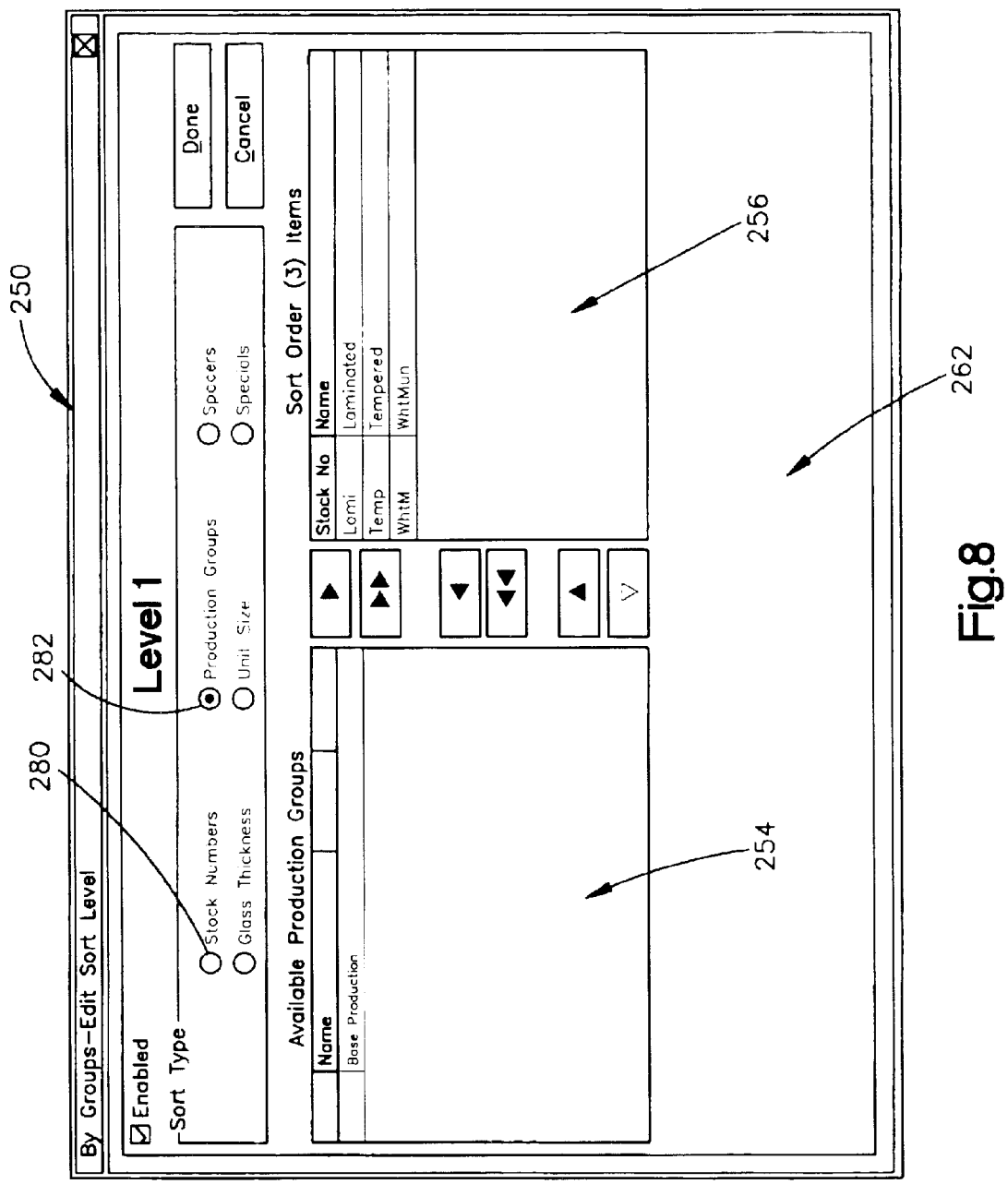

The items within the groups can be given a manufacturing sequence by accessing a common shared Multi-Level Sort Configuration Setup dialog (FIG. 6). Each group may be given its own individual Multi-Level Sort Configuration. More details of the Multi-Level Sort Configuration Setup are described below.

During the scheduling process cycle, the ordered glass lites and IG Units are seperated into their respective groups using the groups priority setting and its selection critiera. The items in each group are then placed in their manufacturing sequence determined by using either the common shared Multi-Level Sort Configuration Setup or the groups own individual Multi-Level Sort Configuration Setup. All the glass lites are then placed into an optimization list and optimized. After optimization each group' items are placed into the production schedule using the group's priority assignment.

Each window fabricating or manufacturing machine has features that allow the selection of a "Default" manufacturing sequence or allow the creation or an "Custom" manufacturing sequence. The creation of a custom manufacturing sequence utilizes the specific sort criteria of the group(s) to be displayed and processed. The groups can also be processed in the sequence that the schedule was built. The "Default" or "Custom" manufacturing sequences can be built and activated locally or remotely. These sequences may be built, set and activated locally on the machine using the machines' software menus or remotely using a script command file sent to the machine via a variety of methods including but not limited to the following (i.e. floppy, hardwired and wireless LANS and WANS, infrared, and Intra/Intrenet web services).

Group Setup:

The group setup screen (FIG. 1) is activated via a menu selection or a command button from an application dialog.

Disabled groups are shown with an "X" (such as the laminated group 110 in FIG. 1) in their listing. Priority is set for the different groups by selecting the group with the mouse and moving the group up or down in the listing using the "Move Up", "Move Dn" buttons 112, 114. The group's properties are changed by clicking on the "Edit Group Properties" button 116 with a user controlled mouse when a particular group is highlighted. Groups are also manipulated using the "New, Rename, Copy, Remove or Edit Group Properties" command buttons 120, 122, 124, 126, 116. If the supervisor wants to add a new group to increase the efficiency of the manufacturing process, the new button 120 is clicked and a new group added by giving it a name and a color. The new group is added to the list visible in FIG. 1.

Figure 1:
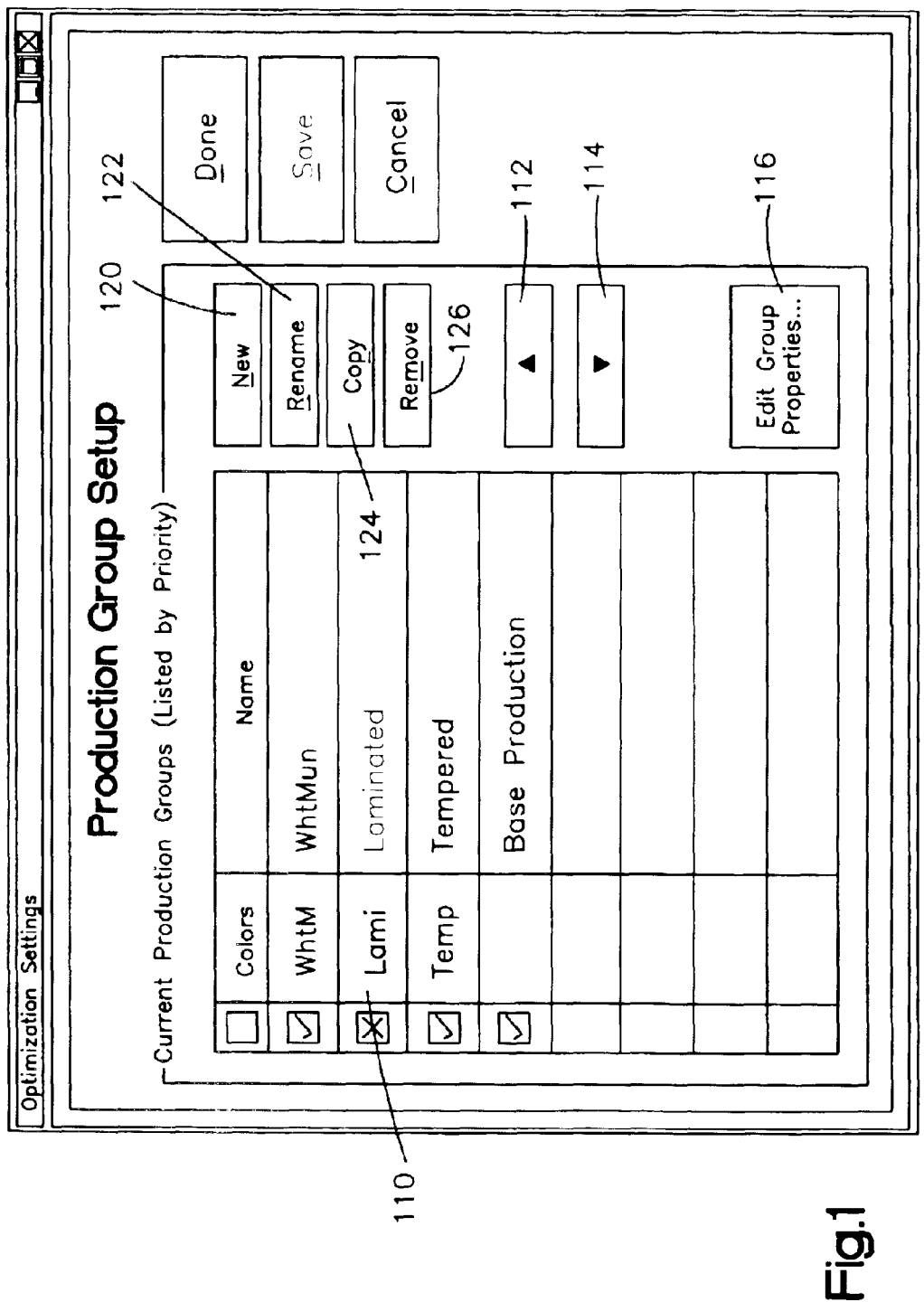
FIG. 1 is dialog showing a group set up user interface which allows a user to establish, prioritize and enable groups.
Figure 2A:
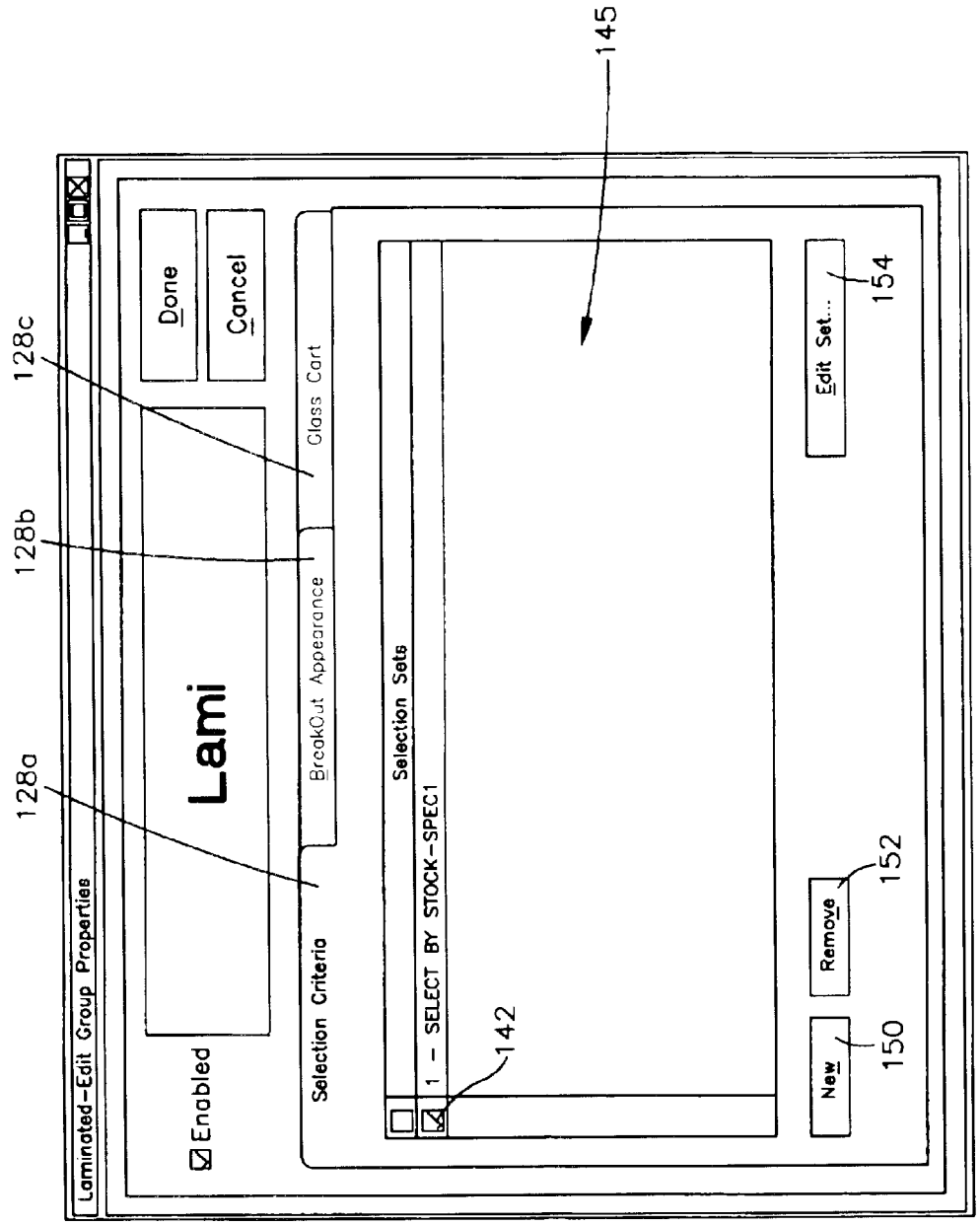
FIGS. 2a, 2b, and 2d are dialogs for defining group properties that are accessed by an "edit group properties" button shown in FIG. 1.
Figure 2B:
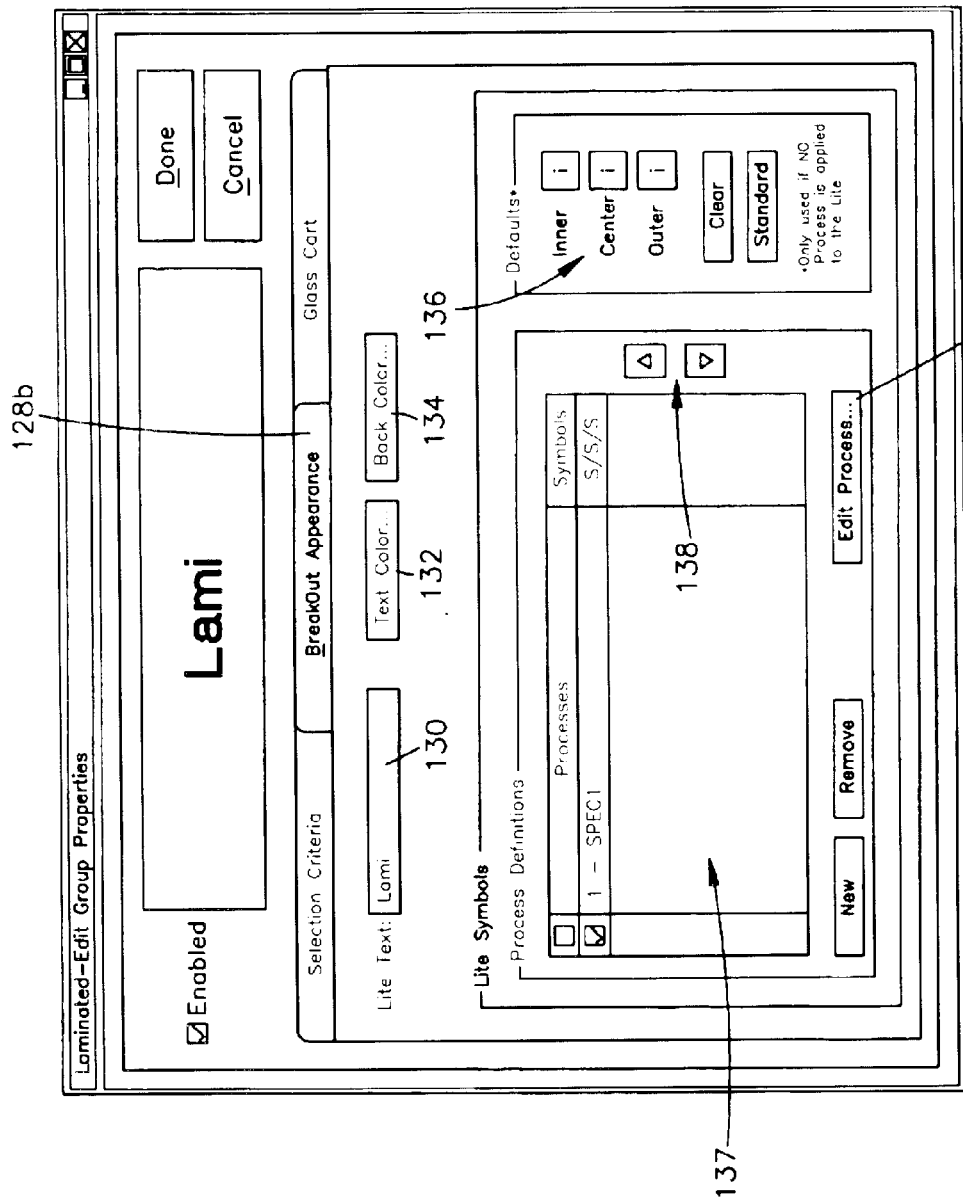
Figure 2D:
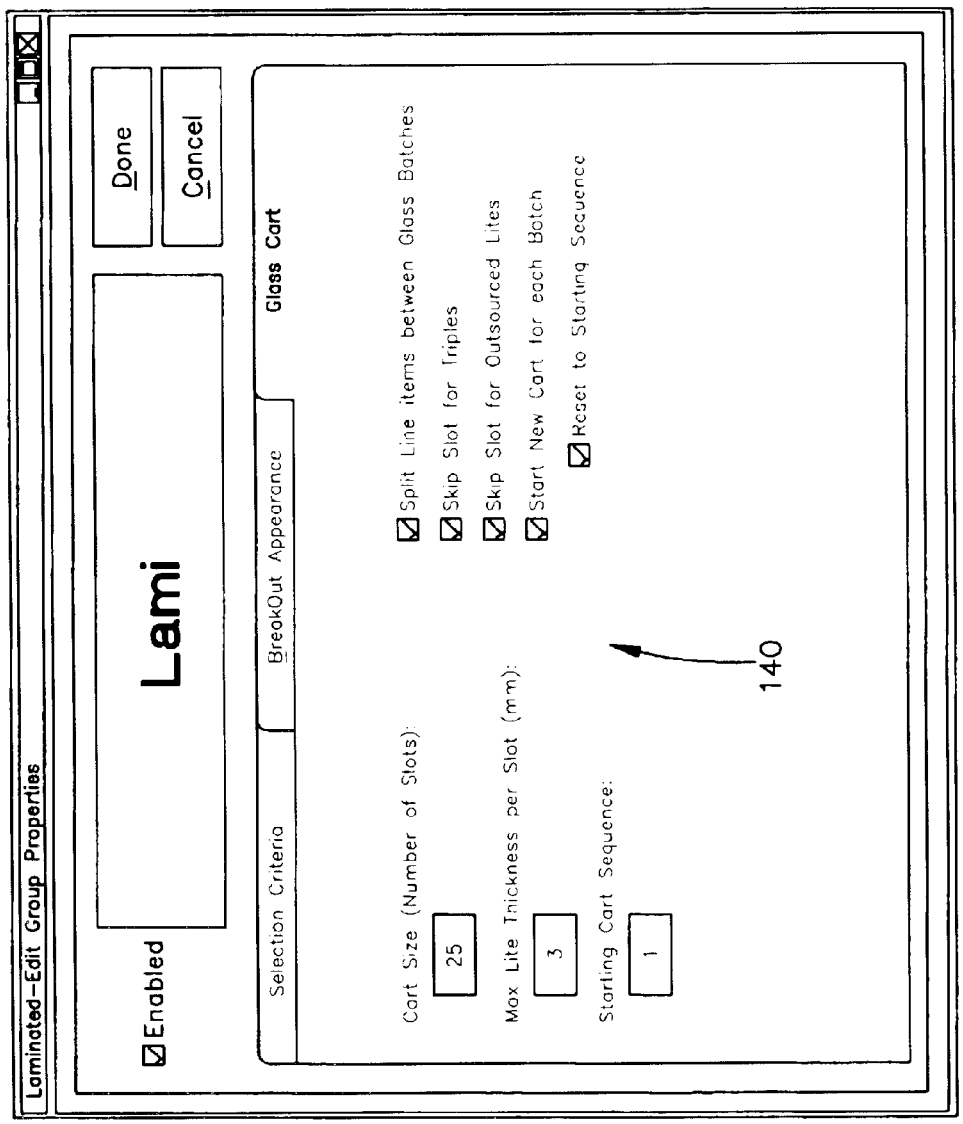

Group Properties Setup:

FIGS. 2a–2d depict a series of group properties set up windows. More particularly, FIG. 2a is the set-up window for the Laminated group that was set up based, for example, upon receipt of a particular customer order or orders. The laminated designation "LAMI" is for windows having a film coating applied to at least one glass lite. Often the film is sandwiched between two glass layers or lites of the glass unit. The dialog of FIG. 2a is accessed by clicking on the edit group properties button 116 of FIG. 1. A tabbed dialog for editing group properties is shown in FIG. 2a. This dialog has three tabs: a selection criteria tab 128a, a Breakout Appearance tab 128b, and a Glass Cart tab 128c. With the selection criteria tab selected, pressing an "edit set" button 154 launches a dialog shown in FIG. 3. FIG. 2b is a depiction of the edit group properties dialog with the "Breakout Appearance" tab 128b selected and FIG. 2d is a depiciton of the edit group properties dialog with the Glass. Cart tab 128c selected. Note, the contents of a window within the dialog change depending on which tab has been selected by the user. In FIG. 2a the dialog depictes selection sets for the laminated group based on stock number.

Apperance Properties:

Appearance properties for the group are set up in the FIG. 2b dialog (the breakout appearance tab 128b is selected) and are used on various prior art manufacturing applications such as WinIG® and WinCut®. These manufacturing processes are licensed by the assignee of the present invention to window manufacturers.

The following properties (FIG. 2b) control a group's display apperance: A "Text" field 130 (FIG. 2b) is a four character field used to identify the group. A "Text Color" button 132 allows the selection of a color to be used for the "Text" characters for a group. A "Back Color" button 134 allows the selection of the background color for the group.

A default Lite Symbols area 136 (FIG. 2b) contains fields that are used to designate the lite's position within an IG Unit: "i" means the inner lite, "c" means the center lite of a Triple IG Unit and "o" means the outer lite. For Standard two lite IG Units, the "c" designator is not used, only the "i" and "o" designators.

Additional Lite process symbols are selectable for a group to show lites of an IG Unit that have a special process associated with it. These specials override the default designators depicted in the area 136. The processes for a lite are listed in a window 137 which lists special processes that are defined in the dialog of FIG. 2c. The window 137 accomodates multiple processes. By using the new button additional processes can be added to the lite, up to a maximum of eight processes can be added but only the first 5 process symbols are displayed (TLA would mean Tempered,Laminated, Accentrim), however, and the then current process is selected by a checkbox to the left of the process. An up/down arrows 138 allow the user to move up and down through the list of processes in the window 137. The user moves up and down the processes in the window with these arrows 138 and can modify the process by clicking on the "Edit Process . . . " button 139 located at the bottom of the dialog in FIG. 2b.

Turning to FIG. 2c the special processes applied to a lite can be designated by assigning an associated letter to the lite in a window 141. Predefined letters in this region are "A"—Accentrim Film Process. "T"—Tempered Process. "L"—Lamination Process. "G"—Grinding Process. and "S" Specials. The window 143 to the left has two radio buttons that allow the processes in a window 144 to be listed by stock number or processes associated with a process of applying tape to the lite by means of the so called Accentrim film process. The depiction of FIG. 2c is for the processes listed by stock number. Arrow buttons 145 in FIG. 2c allow the stock number listed processes on the left to be moved to a selected item window 146 on the right. If one of the processes having a predefined letter is selected the window 141 is automatically populated with that designator. If another process or combination of processes is chosen the user must add a symbol into the window 141. When the appropriate processes have been moved to the window 146, the user clicks on the done button to return to the dialog of FIG. 2b. If the user chooses special option 1 and special option 2 then under the window 137 of FIG. 2b would appear Spec 1 then beneath it Spec2.

Additional Processes can be added by assigning special inventory stock numbers to the FIG. 2c dialog.

Transport (Cart or Conveyor) Properties:

The Transport (Cart/Conveyor) Properties Area 140 in the FIG. 2d dialog indicates cart properties but can be expanded to include conveyor routing properties as well. Additional cart properties include cart bar code labeling, base numbering and printing properties.

Selection Criteria:

A Selection Critiera check box 142 (FIG. 2a) allows the enabling and disabling of the selection criteria for a group. Typically there are multiple selection criteria set up for a group and the selection criteria for the group is set up by the process described below in conjunction with FIG. 3. If the checkbox 142 is unchecked all selection sets for the listing in the window 145 then an "X" will be placed on a group's listing (see the dialog of FIG. 1). This identifies to the supervisor that this group has been disabled. If a selection criteria has been previously established for the group then that set of criteria will still exist, but it will not be used in processing the order. This allows easy enabling and disabling of groups as the manufacturing process changes. Selection Criteria is used to determine the items that make up the group. Placement of the items in the list do NOT determine the manufacturing sequence.

To create, remove or change the selection criteria the operator uses the "New", "Remove" or "Edit Criteria" buttons 150, 152, 154 found in the FIG. 2a dialog.

Figure 4:
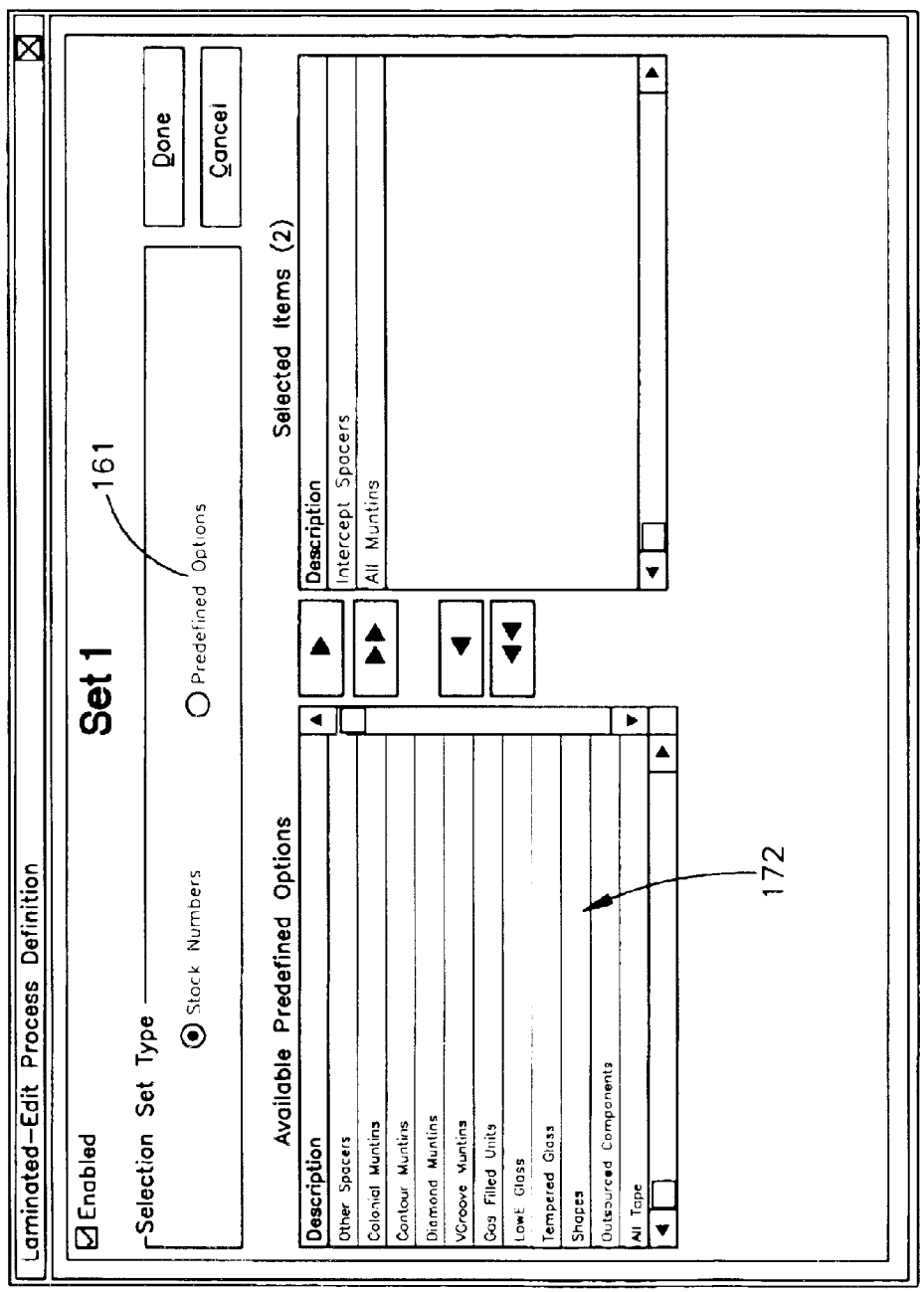
FIG. 4 is a selection dialog for choosing group properties based on predefined options from a listing of those options.

Selection Set Types:

FIGS. 3 and 4 show dialogs of the different Selection Set Types including but not limited to the following "Stock Numbers and Predefined".

Selection Criteria Setup:

The FIG. 3 dialog is used to set the selection type criteria for a group and is accessed by clicking on the "edit set . . . " button in FIG. 2a. The FIG. 3 dialog shows a "Stock Numbers" radio button 160 selected. A move selection right ($\geqq$) button 162 moves a hightlighted item from an Available Stock Numbers List Box 163 to the Selected Items list box 164. The move all right (>>) button 165, moves every item from the Available Stock Number list box over to the Selected Items List box 164. The move selection left ($\leqq$) button 166, moves just the hightlight item from over the Selected Items list box back to the Available Stock numbers List box. The move all left (<<) button 167, moves every item from the Selected Items List box back to the Available Stock Number list box.

The FIG. 3 dialog allows easy visual access of the available stock numbers. A filter selection area 170 is included to allow only those (checked) stock number types to be listed in the Available Stock Numbers List box.

Selection Set Type (Predefined):

FIG. 4 depicts a dialog which displays the predefined radio button 161 selected (rather than the stock numbers radio button 160 of FIG. 3). This is not the same as a Special Stock number. The predefined types dialog of FIG. 4 allows selection of commonly used items to be made into their own special group. Stated another way, by choosing the stock number radio button 160 the user is allowed to make up a group from existing stock numbers within the manufacturing facility. By choosing the predefined radio button 161 the user is free to choose from predefined items not identified by a stock number. One example of a predefined item found in the left list box 172 is a "shapes" which includes all units having non-rectangular lite shapes.

Figure 5:
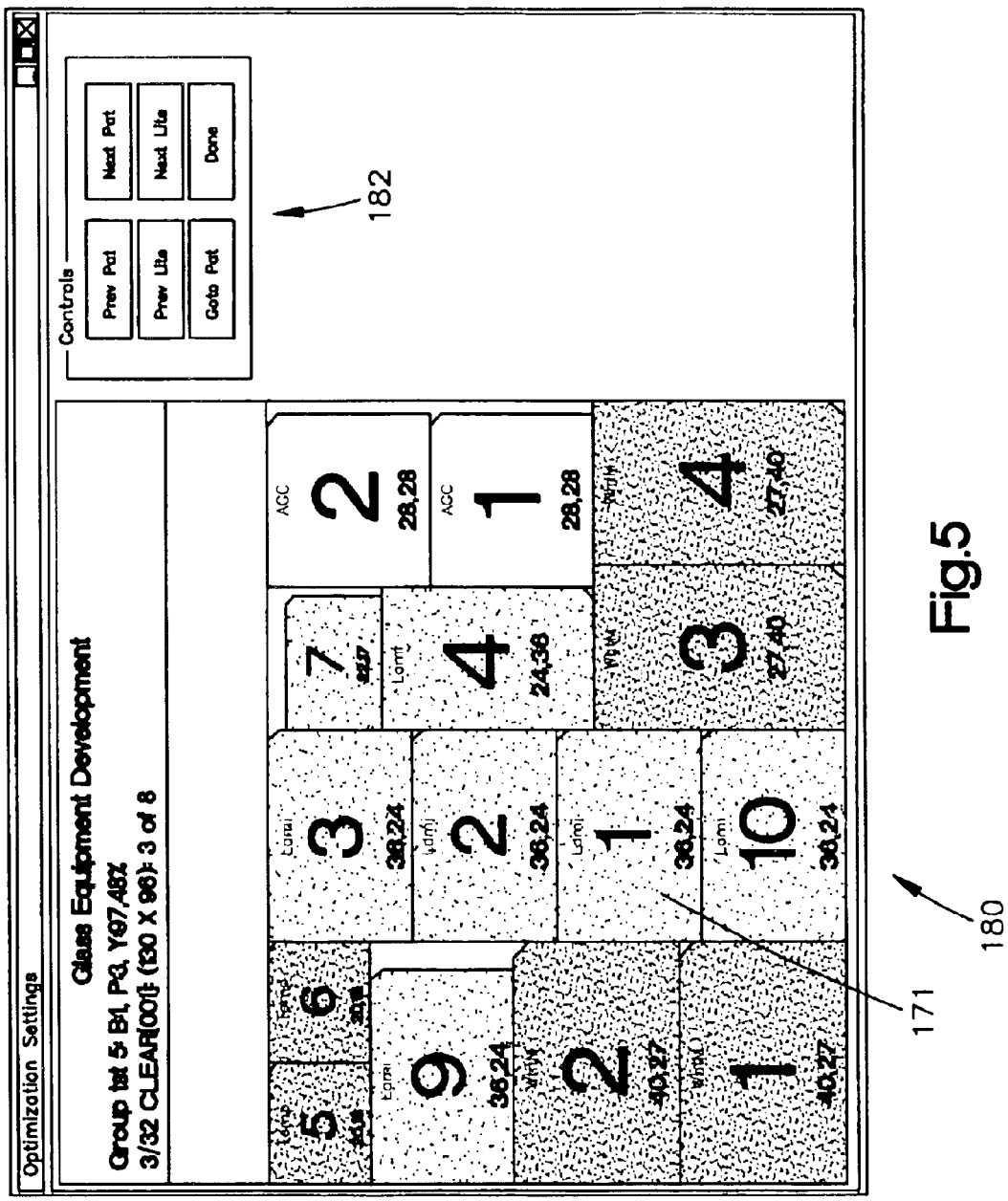
FIG. 5 shows a break out display showing lites that belong to groups defined by the user.
Figure 13:
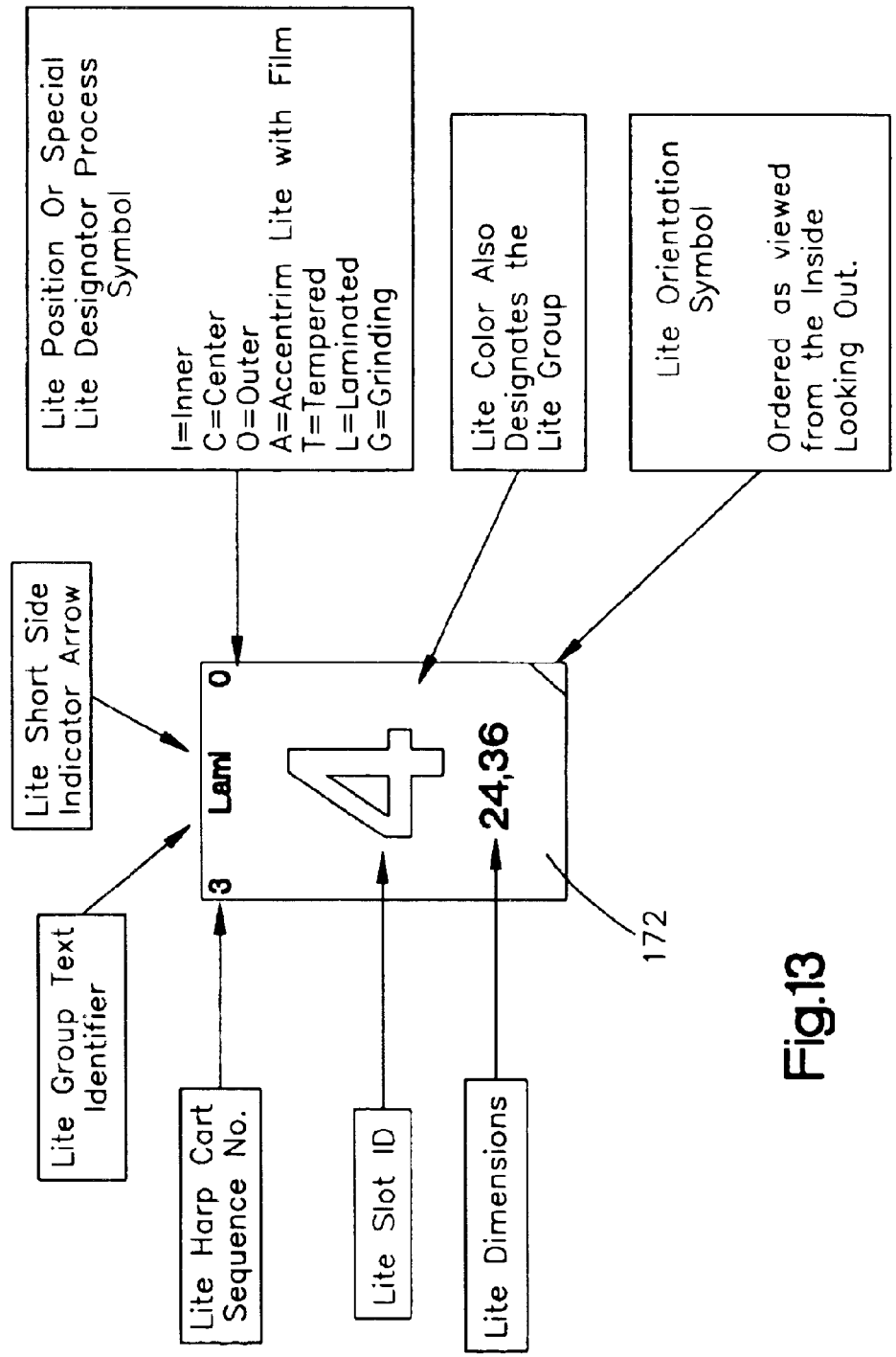
FIG. 13 is an enlarged view of a depiction of one lite on a breakout screen showing details of the information depicted for that lite.
Figure 14:
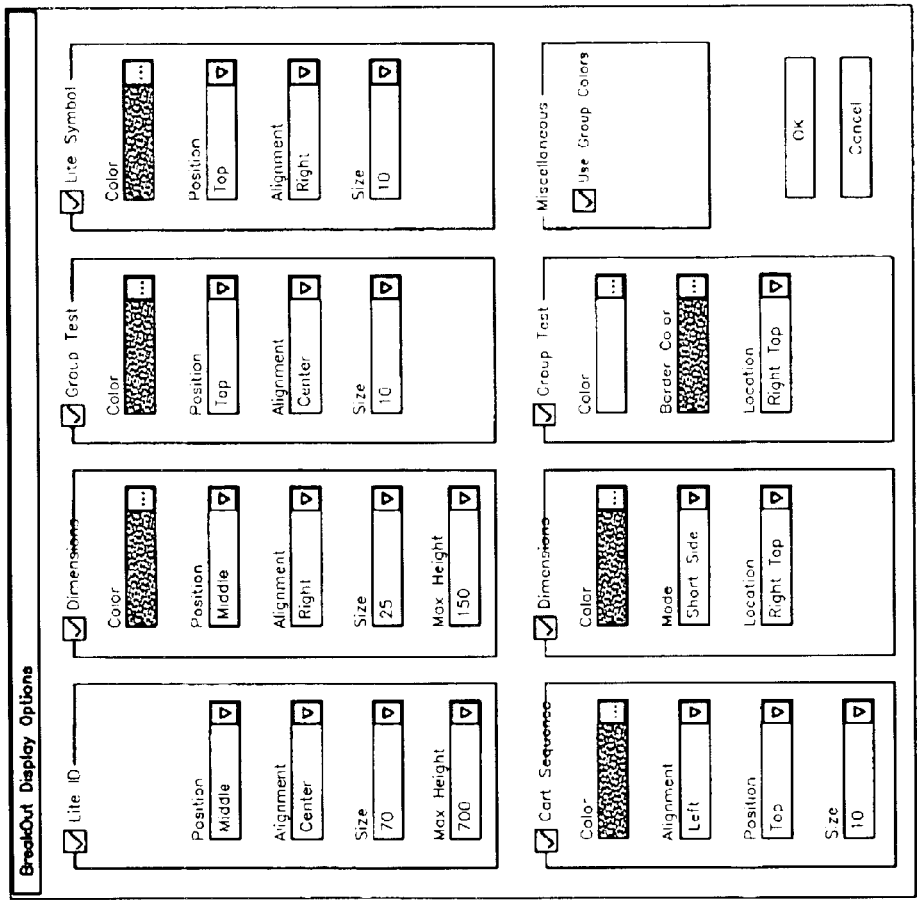
FIG. 14 is a dialog that shows how the symbols for a lite can be enabled and disabled to allow the manufacturing operators freedom in selecting what is displayed on the Breakout Screen of FIG. 5.

Grouping Breakout Display:

FIG. 5 shows a typical production glass breakout screen 180 utilizing a representative grouping method developed by the assignee of the invention. There are lites from five different groups in this breakout display (Laminated, Tempered, Accentrim, WhiteMuntin, and the Base group). In the prior art, this would have have taken 5 different sheets of glass, (one for each group) using the prior art means of handling different or speciality items. Each lite represented on the breakout screen 180 is labeled with its group (Lami for example to designate Laminated) as well as the physical dimensions of the lite. In the representative embodiment the group is also represented by the color of the lite on the screen. Although not depicted on the drawings, in the example the laminated group is represented by yellow. Thus a first laminated lite 171 on the breakout screen shown in FIG. 5 has dimensions of 36 by 24 inches of the total glass dimension of 130 by 96 inches. Note, the breakout patterns for other glass sheets that make up a customer order may be viewed by clicking on buttons 182 that are located at the upper right of the screen. The tempered glass lites located at the upper left of the FIG. 5 depiction are assigned Slot designators "5" and "6". These are the actual slot number indicators of the tempered Glass Harp Cart that have been assigned to the lites once the customer order has been processed by the optimizer. The operation of the optimizer is summarized below. Other tempered glass lites in the same group can be found on other breakout screens. Note, an orientation of the lite is designated with a lite orientation symbol in its corner. The various indicators that appear in FIG. 5 are depicted in further detail in FIG. 13. Turning to FIG. 13, a lite 172 found in FIG. 5 is shown having the various designated indicators. This means of indicating the lite's characteristics and routing information helps the person responsible for moving the lites along its path in the production process to correctly assure that the lite reaches its intended station where it is joined with other group components to form a IGU. The appearance of the lite designations appearing on the breakout screen 180 found in FIG. 5 is user controlled by a dialog 181 that is shown in FIG. 14.

In addition to the visual aid presented by the breakout screen 180 of FIG. 5, the invention contemplates actual physical labeling of window components as they are routed through a manufacturing facility. The physical tag or label applied to the component is in the form of a bar code label that is scanned by existing bar code readers that interface with the same computer network that optimizes the manufacturing of the windows. The bar code contains the group to which the component (such as a glass lite) belongs as well as the other information conveyed to the user by the visual display of FIG. 5. In the FIG. 5 depiction, the information presented to the user or window fabricator is presented by means of a software component that takes a template created by the use of the set up screens and creates a data structure of information relating to the components that make up the customer order. The same software component that presents the data to the screen can instruct a labeling device to encrypt this data onto a bar code.

Multi-Level Sort Configurator

A Multi-Level Sort Configurator is designed for its ease of use and provides a highly effective way to set up manufacturing sequences. The dialogs in FIGS. 6–13 depect a setup for a fairly complex manufacturing sequence.

The Multi-Level Sort Configuration setup screen 200 of FIG. 6 is activated via a menu selection or a command button from an application dialog. Multiple Sort Level Configurations can be created. Individual Sort Configurations are manipulated by selecting a configuration then by using the "Rename, Copy, or Remove" command buttons 210, 212, 214. A new configuration is created by using the "New" command button 216.

Sort Levels:

The screen depiction of FIG. 6 includes three levels. To create, remove, change a level position or edit a Sort Level Criteria the user clicks on the "New", "Remove", "Move Up", "Move Dn" or "Edit Sort Level" buttons 220, 222, 224, 226, 228.

Each sort level contained within the list 229 of the different sort levels enumerates the sort criteria of that sort. The priority of the items in the sort level is determine by placement of the item in the sort level list.

In the FIG. 6 depiction at level 1 (first row in the list 229) the production groups will determine the sort order. The priority of the productions groups is established when the groups were created (See FIG. 1). Using the above "By Groups" configuration, the priority of FIG. 1 is "WhtMun", "Tempered" then "Base" (See FIG. 1). Since the "Lami" group has been disabled it is not include in the sort. FIG. 6 lists a different grouping priority. The laminated group (which was defined but not enabled in FIG. 1) is now enabled and in fact is the highest priority group. When the software optimizer analyses the templates established by the user, a windows component can belong to two groups. The priority that is established in the FIG. 1 setup determines which group the optimizer actually assigns a component.

Returning to FIG. 6, in the second level (Level 2 in the list 229) "NOMUNTIN" has a higher priority than "MUNCOLWHT, MUNCOLTT, MUNCONTWHT". These designations mean no muntin bar, a colonial white muntin bar, a two tone muntin bar and a white contour muntin bar. In Level 3 "NOGAS" has a higher priority than "AG1" "NOGAS" means to produce the IGUs that do not use an insulating gas before the IGUs that use an insulating gas, "AG1" is the number.

Sort Sequence:

The Sort Levels are nested with the previous Sort Level Items using a "Top Down Drilling" method (always start at the highest level and work down). The first item in the previous level is combined with the items in the next level using that level's priority. In the above example using the grouping of FIG. 1 (But not FIG. 6) all the items in the "WhtMun" group will be produced first then followed by the items in the "Temp" group then the items in the "Base" group. The production sequence of the items inside each group is determined by the remaining levels.

Using the "WhtMun" group example, this group will be sorted/sequenced in the following maner:

1. All the items that have "NOMUNTINS" ($1^{st}$ item in level 2) and have "NOGAS" ($1^{st}$ item in level 3) will be first. (The process of using all the $1^{st}$ level items continues until the last level is reached.)

2. Then all the items that have "NOMUNTINS" ($1^{st}$ item in level 2) and have "AR1" ($2^{nd}$ item in level 3) will be next. (This process continues until the items in the last level are used.)
3. Then all the items that have "MUNCOLWHT" ($2^{nd}$ item in level 2) and have "NOGAS" ($1^{st}$ item in level 3).
4. Then all the items that have "MUNCOLWHT" ($2^{nd}$ item in level 2) and have "AR1" ($2^{nd}$ item in level 3).
5. Then all the items that have "MUNCOLTT" ($3^{rd}$ item in level 2) and have "NOGAS" ($1^{st}$ item in level 3).
6. Then all the items that have "MUNCOLTT" ($3^{rd}$ item in level 2) and have "AR1" ($2^{nd}$ item in level 3).
7. Then all the items that have "MUNCONTWHT" ($4^{th}$ item in level 2) and have "NOGAS" ($1^{st}$ item in level 3).
8. Then all the items that have "MUNCONTWHT" ($4^{th}$ item in level 2) and have "AR1" ($2^{nd}$ item in level 3).

In this example components from all the other or remaining groups will be sorted in the similar manner. The present exemplary embodiment can include over 100 different sort levels in the sort configuration of FIG. 6 and by reprogramming the dialogs can have many more.

Sort levels for an existing level may be redefined by clicking on the "Edit Sort Level . . . " button 228 with a sort level on the FIG. 6 dialog highlighted. If for example the level one sort level is highlighted and the user clicks on the button 228, the FIG. 8 dialog 250 will appear. Note that the radio button 282 is checked. This automatically updates the dialog 250 to list the available production groups on one side 254 of the dialog and the selected sort order for those groups on the other side 256 of the dialog 250. Recall that the priority of the groups set up in FIG. 1 determines into which group a component that belongs to two groups belongs. It is the sort level of the group set up in FIG. 8, however, that will be used by the optimizer to determine the production priority of that component. Note that the level one defining dialog of FIG. 8 need note be based on groups. Instead, for example, by checking a radio button 280 designated stock numbers, the group can be sorted according to existing stock numbers. When the button 280 is checked, the left side 254 lists available stock numbers in a list and selected stock numbers are listed on the right hand side 256 and the contents of the two lists is controlled by the transfer buttons 262 between the two lists.

Sort Types:

The dialogs in FIGS. 6–13 show the different Sort Types including but not limited to the following "Stock Numbers, Production Groups, Spacers, Glass Thickness, Unit Size and Specials". A special filter section (FIG. 7) allows for easy viewing and selection of individual stock types.

Selection and Placement of Items in the Sort Order List:

Consider the Stock Number Level 2 dialog of FIG. 7. The user accesses the dialog by highlighting the second level sort in FIG. 6 and clicking on the button 228. A move selection right ($\geqq$) button 230, moves just the hightlight item from the Available Stock Numbers List Box 232 to the Sort Order Items list box 234. A move all right (>>) button 236, moves every item from the Available Stock Number list box over to the Sort Order Items List box. The move selection left ($\leqq$) button 238, moves just the hightlight item from over the Sort Order Items list box back to the Available Stock numbers List box. The move all left (<<) button 240, moves every item from the Sort Order Items List box back to the Available Stock Number list box. The move selection (Up) and (Down) buttons 242, 244, adjust the selected item sort priority within the level.

Sort Type Stock Numbers:

The Sort Type "Stock Numbers" lists all the stock number that exist in the inventory. Special Stock Numbers have been added to the list for the "NO" prefix (i.e. NOGas, NOSpacer, NOTape, NOMuntin etc). The sort order sequence is set by the placement of these items in the Sort Order List.

Sort Type Production Groups:

The Sort Type "Production Groups" (FIG. 8) lists all the production groups. The sort order sequence is set by the placement of these items in the Sort Order List.

Sort Type Spacers:

The Sort Type "Spacers" (FIG. 9) lists all the Spacer Sizes and Types. Note a sort type at this third level sort criteria is accessed by the user clicking one of a group of radio buttons 280–285 that appear on each of the dialogs in FIGS. 7–12. The sort order sequence is set by the placement of the spacer items in the Sort Order List to the right in FIG. 9.

Sort Type Glass Thickness:

The Sort Type "Glass Thickness" (FIG. 10) lists various ways to sort by glass thickness. The sort order sequence is set by the placement of these items in the Sort Order List.

Sort Type Unit Size:

The Sort Type "Unit Size" (FIG. 11) lists various ways to sort by Size of the IGU Unit. The sort order sequence is set by setting the various options found in the dialog.

Sort Type Specials:

The Sort Type "Specials" (FIG. 13) lists other ways to combine items. The sort order sequence is set by the placement of these items in the Sort Order List.

Software Implementation

Figure 16:
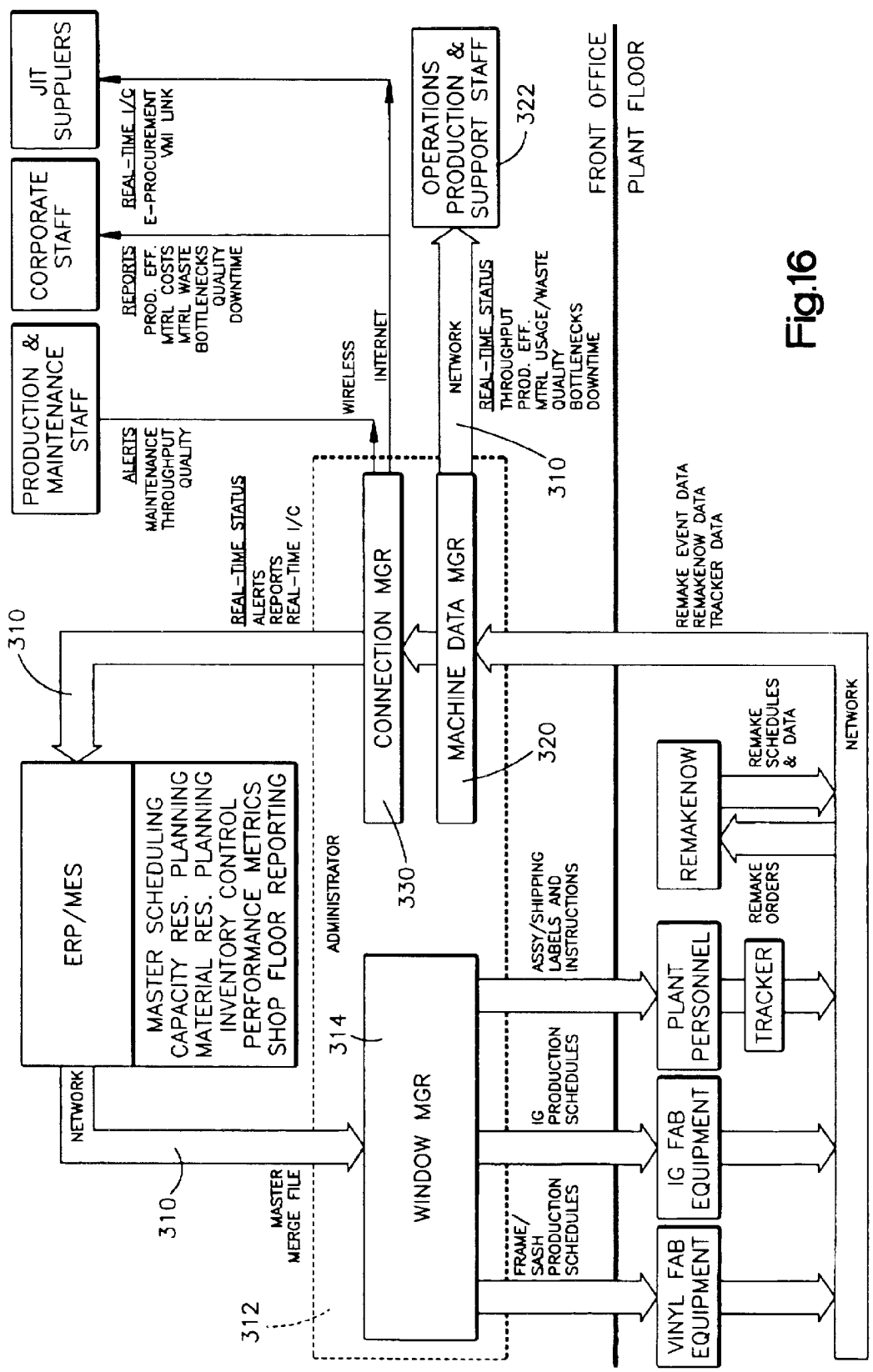
FIG. 16 is a functional block diagram showing a relation between different software components that form an integrated family of software components for simplifying and automating windows manufacture used in practicing an exemplary embodiment of the present invention.
Figure 17:
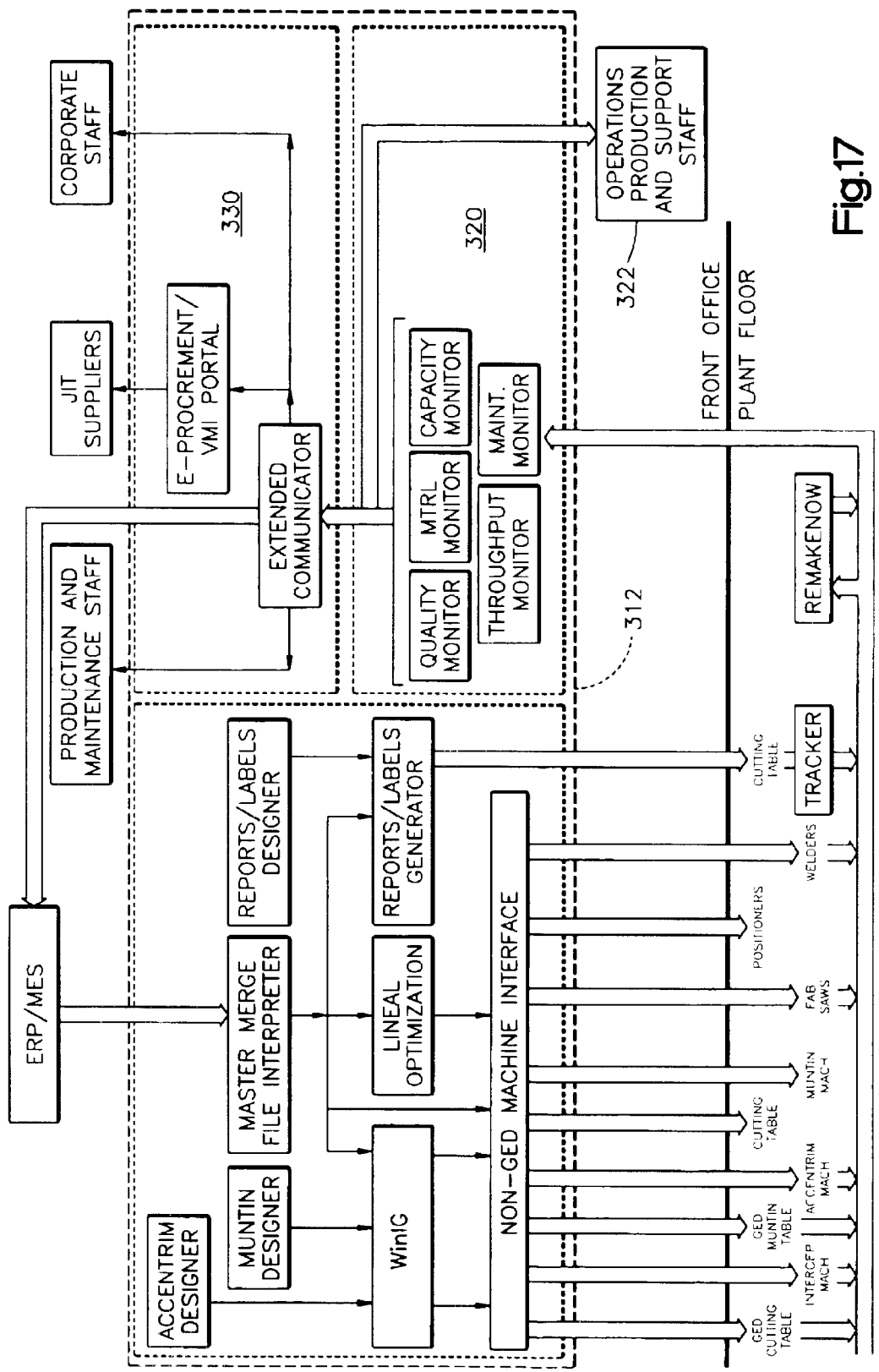
FIG. 17 is a software module layout depicting the module layout of the software components whose functional layout is depicted in FIG. 16.

The software for setting up and presenting the dialogs described above executes on a computer that is one of a number of networked computers that communicate with each other over a network 310 typically a local area network at a manufacturing facility. FIGS. 16 and 17 are functional and module layout block diagrams of an integrated family of software components designed to simplify and automate window manufacturing at a manufacturing facility. The components include an administrator component 312 which implements a user friendly graphical user interface that accesses all products and features implemented by the software components of FIGS. 16 and 17.

A window manufacture component 314 (prior versions of which were sold under the designation WinIG) integrates control of window and insulated glass unit manufacture machines and processes from a single software platform. As discussed below, it is the window manufacture component 314 that makes use of the grouping and sorting definitions discussed above. The window manufacture component includes lineal optimization, glass optimization, custom label/report generation and machine interfaces to a variety of different window manufacturing machines.

A machine data manager 320 automatically captures real time production information directly from machines in the facility. Custom reports, graphs, charters, etc are designed by the plant personnel for production analysis and performance measurement. The machine data manager 320 also provides alerts which automatically notify the customer if an important parameter has been breached. Parameters reported as an output to operations, production and support staff 322 on the network 310 include machine maintenance, throughput, quality, production efficiency, material usage, inventory control data, bottlenecks and machine downtime.

A connection manager 330 links the software depicted in FIGS. 16 and 17 to external computer/software systems. The connection manager 330 allows the software to automatically deliver alerts, reports, and real-time production information to ERP/MES systems (Note, ERP=Enterprise Resource Planner; MES=Manufacturing Execution System; these are parts of a customer's main computer system sometime known as the upper office system) via custom direct links. Remote corporate locations are sent the same reports via the Internet. Internal production/operations/maintenance staff can be sent this information via wireless pages/phones/PDAs. Direct links to suppliers are also made via the Internet.

Several stand-alone process software modules exist to simplify or automate specfic manufacturing related processes such as remake manufacturing, custom muntin grid designs custom labels/reports design, real-time production tracking and tape pattern design.

Figure 18:
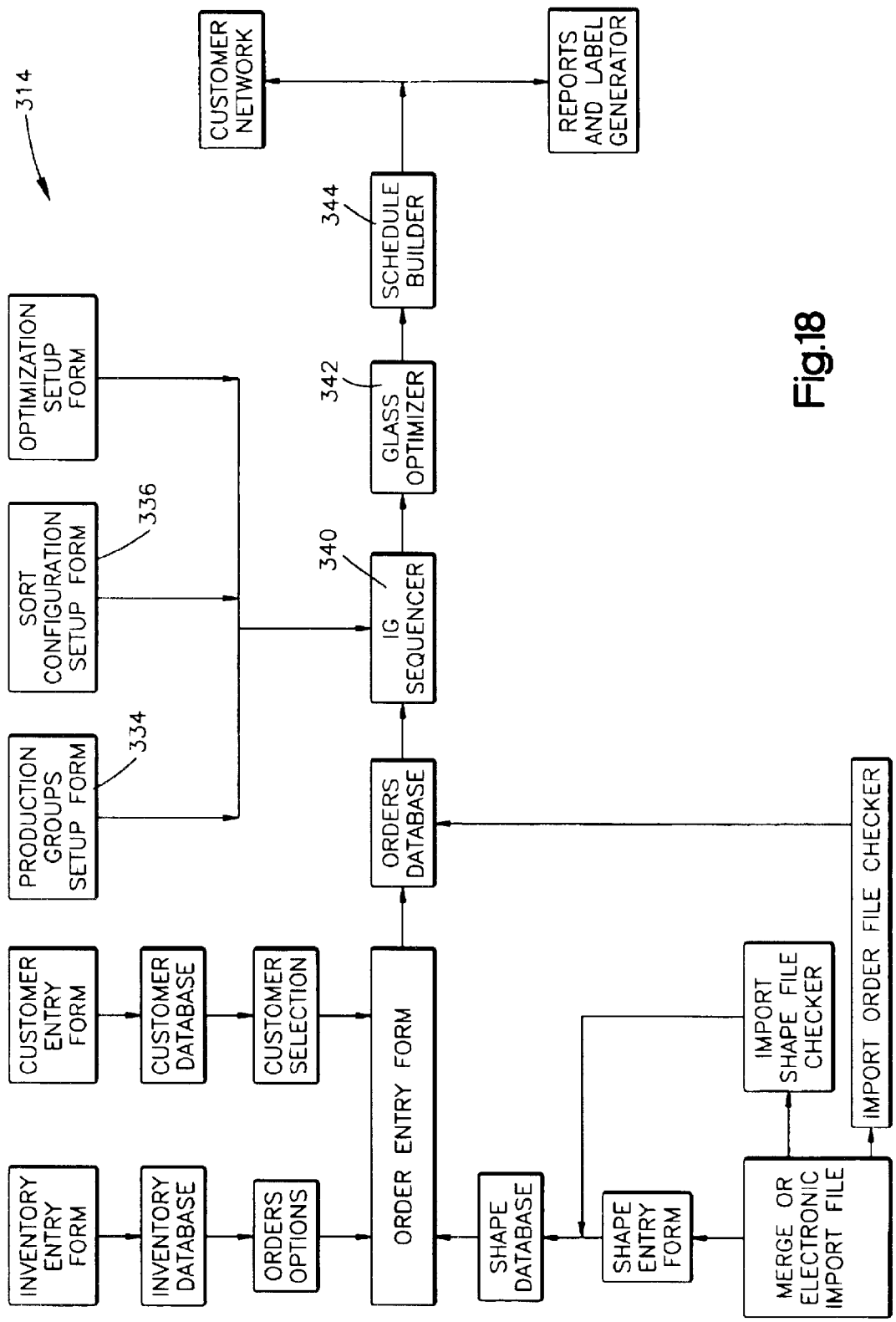
FIG. 18 is block diagram of a windows manufacturing component of the functional block diagram of FIG. 17.

The interaction between the software module that sets up the grouping and sorting dialogs and the window manager that controls the manufacturing is depicted in the block diagram of FIG. 18.

FIG. 18 depicts a windows manufacturing flow diagram. As seen, the "Production Groups Setup" and "Sort Configuration Setup" modules 334, 336 implement data entry dialogs that form part of the windows manager 314. The production grouping items and the sort configuration items feed directly into an IG sequencer module 340. The sequencer module 340 uses the information set up by the user relating to production groups and sort configuration to generate the manufacturing sequence for the IG units. This is accomplished by combining the production groups that use the same glass types and create the glass carting data structures for each production group. A glass optimizer module 342 uses the glass and cart data from the IG sequencer 340 to create optimal glass patterns to keep the IG units lites with their respective production group color and their glass cart identification. The software modules in FIG. 18 are implemented in visual basic with some code written in C++. The schedule builder 344 builds the machine schedule file. The machine schedule file (in an exemplary system identifed by a file of type *.ged) is then sent to the Reports and Label module and to a Customer's Network Machine Release Folder.

While an exemplary embodiment of the invention has been described with a degree of particularity it is the intent that the invention include alterations and modifications from the disclosed design falling within the spirit or scope of the appended claims.

What is claimed:

1. A method of manufacturing a window or a door product comprising:
providing a control screen on a viewing monitor for defining a number of manufacturing groups based on a plurality of customer orders for classifying constituent components which combine to form a window or door product; and
providing a production screen on a viewing monitor depicting the constituent components with a group designator corresponding to a constituent component on the production screen during movement of said constituent components through a manufacturing or assembly location producing window or door products from the customer orders.

2. The method of claim 1 wherein constituent components within a group are sorted by a sort criteria.

3. The method of claim 1 wherein different groups are assigned different priorities to determine a constituent component's group classification when it belongs to two or more groups.

4. The method of claim 1 wherein constituent components for a window or door are obtained from a common piece of stock material that is arranged on a viewing screen and components from different groups are obtained from a given piece of stock material.

5. The method of claim 4 wherein labels or tags that include a group designator are attached to window or door constituent components as they are routed through a manufacturing or fabrication process.

6. The method of claim 5 wherein the group designator comprises a color.

7. The method of claim 5 wherein the group designator comprises a text designator.

8. The method of claim 4 wherein the stock material is a large piece of glass and the constituent components are glass lites that are cut from the large piece of glass for incorporation into a glass unit.

9. The method of claim 8 wherein the production screen includes dimensions of the glass lite.

10. The method of claim 1 wherein defining the manufacturing groups includes a default group into which all constituent components not satisfying a user defined criteria belong.

11. Apparatus for use in the manufacturing of a window or a door comprising:
a programmable controller or computer for defining different component groups of constituent components which combine to form a window or door; and
a display for monitoring constituent components and associated group designators within the different component groups on a viewing screen during movement of said constituent components through a manufacturing or assembly process wherein the associated group designators are assigned to constituent components from a plurality of customer orders by the programmable controller or computer in response to receipt of customer orders.

12. The apparatus of claim 11 wherein the programmable controller or computer includes an optimizer module that processes incoming customer orders based on a sort criteria which is combined with the grouping of constituent components by said programmable controller or computer to determine a constituent component processing sequence.

13. A machine readable medium for use in manufacturing a window or a door comprising instructions for:
providing a control screen on a viewing monitor for defining a number of manufacturing groups based on a plurality of customer orders for classifying constituent components which combine to form a window or door product; and
providing a production screen on a viewing monitor depicting the constituent components with a group designator corresponding to one of the manufacturing groups on the production screen during movement of said constituent components through a manufacturing or assembly location of the window or door product from the customer orders.

14. The machine readable medium of claim 13 wherein constituent components within a group are sorted by a sort criteria.

15. The machine readable medium of claim 13 wherein different groups are assigned different priorities to determine a constituent component's group classification when it belongs to two or more groups.

16. The machine readable medium of claim 13 wherein constituent components for a window or door are obtained from a common piece of stock material that is arranged on a viewing screen and components from different groups are obtained from a given piece of stock material.

17. The machine readable medium of claim 16 wherein labels or tags that include a group designator are attached to window or door constituent components as they are routed through a manufacturing or fabrication process.

18. The machine readable medium of claim 17 wherein the group designator comprises a color.

19. The machine readable medium of claim 17 wherein the group designator comprises a text designator.

20. The machine readable medium of claim 16 wherein the stock material is a large piece of glass and the constituent components are glass lites that are cut from the large piece of glass for incorporation into a glass unit.

21. The machine readable medium of claim 20 wherein the viewing screen includes dimensions of the glass lite.

22. The machine readable medium of claim 13 wherein the instructions that define the component groups includes a default group into which all components not satisfying a user defined criteria belong.

23. A method of manufacturing window or door products comprising:
   defining a number of manufacturing groups based on the processing of a plurality of customer orders for classifying constituent components for the same or differing groups, which combine to form window or door products;
   sorting constituent components within a group by a sort criteria; and
   depicting the constituent components with differing group designators corresponding to one of the manufacturing groups on a viewing screen during the movement of differing groups' constituent components through a manufacturing or assembly location of the window or door products.

24. The method of claim 23 wherein different groups are assigned different priorities to determine a constituent component's group classification when it belongs to two or more groups.

25. The method of claim 23 wherein constituent components for a window or door are obtained from a common piece of stock material that is arranged on a viewing screen and components from different groups are obtained from a given piece of stock material.

26. The method of claim 25 wherein labels or tags that include a group designator are attached to window or door constituent components as they are routed through a manufacturing or fabrication process.

27. The method of claim 26 wherein the group designator comprises a color.

28. The method of claim 26 wherein the group designator comprises a text designator.

29. The method of claim 26 wherein the stock material is a large piece of glass and the constituent components are glass lites that are cut from the large piece of glass for incorporation into a glass unit.

30. The method of claim 29 wherein the production screen includes dimensions of the glass lite.

31. The method of claim 23 wherein defining the manufacturing groups includes a default group into which all constituent components not satisfying a user defined criteria belong.

32. A machine readable medium for use in manufacturing a window or a door comprising instructions for:
   defining a number of manufacturing groups based on the processing of a plurality of customer orders for classifying constituent components for the same or differing groups, which combine to form window or door products;
   sorting constituent components within a group by a sort criteria; and
   depicting the constituent components with differing group designators corresponding to one of the manufacturing groups on a viewing screen during the movement of differing groups' constituent components through a manufacturing or assembly location of the window or door products.

* * * * *